United States Patent
Takizawa

(10) Patent No.: US 8,451,522 B2
(45) Date of Patent: May 28, 2013

(54) OPTICAL SCANNING APPARATUS AND IMAGE FORMING APPARATUS USING THE SAME

(75) Inventor: Tokuji Takizawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 299 days.

(21) Appl. No.: 12/616,587

(22) Filed: Nov. 11, 2009

(65) Prior Publication Data

US 2010/0118367 A1    May 13, 2010

(30) Foreign Application Priority Data

Nov. 13, 2008   (JP) .................................. 2008-290755

(51) Int. Cl.
*G02B 26/08*    (2006.01)

(52) U.S. Cl.
USPC ..................................................... 359/207.1

(58) Field of Classification Search
USPC ................... 359/196.1–226.3, 211.4
See application file for complete search history.

(56) References Cited

U.S. PATENT DOCUMENTS

| | | | |
|---|---|---|---|
| 7,538,925 B2 * | 5/2009 | Miyatake | 359/207.1 |
| 2002/0131137 A1 | 9/2002 | Suzuki | |
| 2010/0118367 A1 * | 5/2010 | Takizawa | 359/206.1 |

FOREIGN PATENT DOCUMENTS

| | | |
|---|---|---|
| EP | 0 813 090 A2 | 12/1997 |
| JP | 10-073778 A | 3/1998 |
| JP | 3453737 B2 | 10/2003 |
| JP | 2004-070109 A | 3/2004 |
| JP | 2006-259427 A | 9/2006 |

\* cited by examiner

*Primary Examiner* — Jennifer L. Doak

(74) *Attorney, Agent, or Firm* — Rossi, Kimms & McDowell LLP

(57) ABSTRACT

An optical scanning apparatus and an image forming apparatus using the same, overcoming spot rotation due to scanning line curvature and wavefront aberration deterioration, including an incident optical system for guiding beam emitted from a light source to a deflector, and an imaging optical system for forming image of the beam deflected by the deflector on a scanning surface. In sub-scanning section, the beam enters the deflecting surface obliquely to plane perpendicular to a deflector axis. Each of incident and exit surfaces of an imaging optical element is a surface in which a tilt angle of sagittal line changes from on-axis toward off-axis in sub-scanning direction, the tilt angle indicating gradient of normal to sagittal line on meridian line with respect to main scanning section. The incident and exit surfaces each have the same sign for a difference between change rates of axial and off-axial tilt angles of sagittal line.

21 Claims, 12 Drawing Sheets

SUB-SCANNING DIRECTION

MAIN SCANNING DIRECTION

AZIMUTH 90° (SUB-SCANNING DIRECTION)
AZIMUTH +45°
AZIMUTH 0° (MAIN SCANNING DIRECTION)
AZIMUTH −45°

OPTICAL SCANNING APPARATUS AND IMAGE FORMING APPARATUS USING THE SAME

BACKGROUND OF THE INVENTION

1. Field of the Invention

The present invention relates to an optical scanning apparatus and an image forming apparatus using the same. The present invention is suited to an image forming apparatus such as a laser beam printer, a digital copying machine, or a multi-function printer, which adopts an electrophotography process.

2. Description of the Related Art

In the conventional optical scanning apparatus, in order to record image information accurately, it is necessary that field curvature be appropriately corrected over the entire surface to be scanned and that the optical scanning apparatus have a distortion characteristic (fθ-characteristic) with isokinetic property between a field angle (scanning angle) θ and an image height (distance from the center of scanning) Y. Further, it is necessary that a spot diameter on the surface to be scanned be uniform with respect to each image height. There are conventionally proposed various optical scanning apparatuses or imaging optical systems which satisfy such an optical characteristic.

On the other hand, when multiple light beams are deflected for scanning by using a single optical deflector, it is necessary to guide the light beams after the deflection for scanning to individual photosensitive members corresponding to individual colors by separating the light beams in the sub-scanning direction. Therefore, the incident light beams are required to be incident on a deflection plane of the deflecting means perpendicular to the rotational axis of deflecting means from oblique directions (oblique incident optical system in sub-scanning section).

If the light beams are incident on the deflection plane perpendicular to the rotational axis of the deflecting means from an oblique direction, a scanning line is curved on the surface to be scanned. Therefore, a spot deterioration (hereinafter referred to as "spot rotation") occurs due to a curvature of the scanning line and a deterioration of wavefront aberration.

In particular, a color image forming apparatus, in which the light beams are guided from the optical scanning apparatus to four photosensitive members (photosensitive drums) so as to form latent images and then form Y (yellow), M (magenta), C (cyan) and Bk (black) colors of images of an original on surfaces of the corresponding photosensitive members, has the following problems.

The four color (Y, M, C and Bk) images formed on the individual photosensitive members are superposed on the surfaces of a transfer material such as paper. Therefore, if the scanning lines of the respective optical scanning apparatus corresponding to the photosensitive members have curvatures, the shape of the scanning lines differ among the four colors, which may cause a color drift in the image on the transfer material. As a result, a problem of a conspicuous deterioration in image performance may arise.

In addition, if the spot rotation cannot be appropriately corrected, a design depth becomes significantly small with respect to a case in which the light beam is not incident on the deflection surface obliquely in the sub-scanning section. Therefore, an extreme reduction in manufacturing error is necessary, and hence the products cannot function properly. As means for solving those problems with the oblique incident in the sub-scanning section, some optical scanning apparatuses are variously proposed conventionally.

Japanese Patent Application Laid-Open No. H10-073778 discloses an optical scanning apparatus in which an imaging optical system includes multiple rotation asymmetric lenses, and a meridian line shape connecting sagittal line vertexes of lens surfaces of the rotation asymmetric lenses is curved in the sub-scanning direction (meridian line curving) so as to realize both the curvature of the scanning line and the spot rotation.

In addition, Japanese Patent Application Laid-Open No. 2004-070109 discloses an optical scanning apparatus in which lateral magnification of the imaging optical system in the sub-scanning direction is made constant over the entire field angle, and a surface in which aspherical surface amount in the sagittal line varies is introduced, in which an aspherical surface amount in the sagittal line changes in the main scanning direction, so as to solve the similar problems.

Further, Japanese Patent No. 3453737 and Japanese Patent Application Laid-Open No. 2006-259427 disclose an optical scanning apparatus in which two or more special tilt surfaces (in which the surface normal to the sagittal line changes in the main scanning direction) are introduced in an imaging optical system so as to solve the above-mentioned problems.

If the meridian line curving is to be applied to the optical scanning apparatus disclosed in Japanese Patent Application Laid-Open No. H10-073778, a significant effect tends to be difficult to obtain in an optical surface in which the curvature radius of the sagittal line is reversed, in a vicinity of the position where the sagittal line is reversed.

If the imaging optical system is to be constituted by a single imaging lens in the optical scanning apparatus disclosed in Japanese Patent Application Laid-Open No. 2004-070109, a very thick lens is necessary.

In the optical scanning apparatus disclosed in Japanese Patent No. 3453737 or in Japanese Patent Application Laid-Open No. 2006-259427, the method of changing the tilt angle of the special tilt surface does not necessarily obtain sufficient correction of the curvature of the scanning line or the spot deterioration, and hence there is still a space for improvement. In addition, as described in Japanese Patent No. 3453737 and Japanese Patent Application Laid-Open No. 2006-259427, if the special tilt surface is formed on each lens surface of the two imaging lenses, in other words, if the special tilt surface is formed on different imaging lenses, there may arise a problem that a positional error between the two imaging lenses causes a surface position shift between the special tilt surfaces in the main scanning direction and in the sub-scanning direction.

SUMMARY OF THE INVENTION

It is an object of the present invention to provide an optical scanning apparatus and an image forming apparatus using the same that can appropriately overcome a spot deterioration (spot rotation) due to a curvature of a scanning line and a wavefront aberration deterioration.

According to one aspect of the present invention, there is provided an optical scanning apparatus including: a light source unit; an incident optical system for guiding a light beam emitted from the light source unit to a deflecting; and an imaging optical system for causing the light beam deflected for scanning on a deflecting surface of the deflecting unit to form an image on a surface to be scanned, in which: the light beam emitted from the light source unit enters the deflecting surface of the deflecting unit in an oblique manner with respect to a plane perpendicular to a rotational axis of the deflecting unit in a sub-scanning section; the imaging optical system consists of a single imaging optical element; each of an incident surface and an exit surface of the single imaging optical element is a surface in which a tilt angle of a sagittal line changes from on axis toward off axis in a sub-scanning direction, the tilt angle of the sagittal line indicating a gradient of a surface normal to the sagittal line on a meridian line with respect to a main scanning section; the incident surface and the exit surface of the single imaging optical element each have the same sign for a difference between an axial tilt angle of the sagittal line indicating a gradient of the surface normal to the sagittal line on the meridian line with respect to the main scanning section and an off-axial tilt angle of the sagittal line indicating a gradient of the surface normal to the sagittal line on the meridian line with respect to the main scanning section; if an incident direction of the light beam entering the deflecting surface of the deflecting unit in an oblique manner with respect to the plane perpendicular to the rotational axis of the deflecting unit in the sub-scanning section is negative, a value of the difference is negative; if the incident direction of the light beam entering the deflecting surface of the deflecting unit in the oblique manner with respect to the plane perpendicular to the rotational axis of the deflecting unit in the sub-scanning section is positive, the value of the difference is positive; and the incident surface and the exit surface of the single imaging optical element each have the same sign for a rate of change of the tilt angle of the sagittal line, which changes from on axis toward off axis in the sub-scanning direction.

According to another aspect of the present invention, in the optical scanning apparatus: if the incident direction of the light beam entering the deflecting surface of the deflecting unit in the oblique manner with respect to the plane perpendicular to the rotational axis of the deflecting unit in the sub-scanning section is negative, the off-axial tilt angle of the sagittal line on the incident surface of the single imaging optical element decreases monotonously outside 50%-image height on the incident surface in the main scanning direction, and the off-axial tilt angle of the sagittal line on the exit surface of the single imaging optical element decreases monotonously outside the 50%-image height on the exit surface in the main scanning direction; and if the incident direction of the light beam entering the deflecting surface of the deflecting unit in the oblique manner with respect to the plane perpendicular to the rotational axis of the deflecting unit in the sub-scanning section is positive, the off-axial tilt angle of the sagittal line on the incident surface of the single imaging optical element increases monotonously outside the 500-image height on the incident surface in the main scanning direction, and the off-axial tilt angle of the sagittal line on the exit surface of the single imaging optical element increases monotonously outside the 50%-image height on the exit surface in the main scanning direction.

According to a further aspect of the present invention, in the optical scanning apparatus: if the incident direction of the light beam entering the deflecting surface of the deflecting unit in the oblique manner with respect to the plane perpendicular to the rotational axis of the deflecting unit in the sub-scanning section is negative, the rate of change of the off-axial tilt angle of the sagittal line on the incident surface of the single imaging optical element decreases monotonously outside 50%-image height on the incident surface in the main scanning direction, and the rate of change of the off-axial tilt angle of the sagittal line on the exit surface of the single imaging optical element decreases monotonously outside the 50%-image height on the exit surface in the main scanning direction; and if the incident direction of the light beam entering the deflecting surface of the deflecting unit in the oblique manner with respect to the plane perpendicular to the rotational axis of the deflecting unit in the sub-scanning section is positive, the rate of change of the off-axial tilt angle of the sagittal line on the incident surface of the single imaging optical element increases monotonously outside the 50%-image height on the incident surface in the main scanning direction, and the rate of change of the off-axial tilt angle of the sagittal line on the exit surface of the single imaging optical element increases monotonously outside the 50%-image height on the exit surface in the main scanning direction.

According to a still further aspect of the present invention, in the optical scanning apparatus, the incident surface and the exit surface of the single imaging optical element each have an axial sagittal line sectional shape formed as a meniscus shape having a concave surface toward a side of the deflecting unit, and a curvature radius of the sagittal line of the incident surface and a curvature radius of the sagittal line of the exit surface of the single imaging optical element decrease from on axis toward off axis in the main scanning direction.

According to a yet further aspect of the present invention, in the optical scanning apparatus, a curvature radius of the sagittal line of the incident surface and a curvature radius of the sagittal line of the exit surface of the single imaging optical element change from on axis toward off axis in the main scanning direction, and at least one of the incident surface and the exit surface of the single imaging optical element has the curvature radius of the sagittal line which reverses from on axis toward off axis in the main scanning direction.

According to a yet further aspect of the present invention, in the optical scanning apparatus, the imaging optical element consists of a molded lens.

According to a yet further aspect of the present invention, an image forming apparatus includes the optical scanning apparatus set out in the foregoing, and a photosensitive member disposed at the surface to be scanned.

According to a yet further aspect of the present invention, an image forming apparatus includes the optical scanning apparatus set out in the foregoing, and a printer controller for converting code data supplied from an external device into an image signal and for inputting the image signal to the optical scanning apparatus.

According to a yet further aspect of the present invention, there is provided an optical scanning apparatus including: a light source unit, an incident optical system for guiding a light beam emitted from the light source unit to a deflecting unit; and an imaging optical system for causing the light beam deflected for scanning on a deflecting surface of the deflecting unit to form an image on a surface to be scanned, in which: the light beam emitted from the light source unit enters the deflecting surface of the deflecting unit in an oblique manner with respect to a plane perpendicular to a rotational axis of the deflecting unit in a sub-scanning section; each of an incident surface and an exit surface of an imaging optical element constituting the imaging optical system is a surface in which a tilt angle of a sagittal line changes from on axis toward off axis in a sub-scanning direction, the tilt angle of the sagittal line indicating a gradient of a surface normal to the sagittal line on a meridian line with respect to a main scanning section; and the incident surface and the exit surface of the imaging optical element each have the same sign for a difference between a rate of change of an axial tilt angle of the sagittal line and a rate of change of an off-axial tilt angle of the sagittal line.

According to a yet further aspect of the present invention, in the optical scanning apparatus, the imaging optical system includes a single imaging optical element.

According to a yet further aspect of the present invention, in the optical scanning apparatus, the imaging optical system includes two imaging optical elements, and the incident surface and the exit surface of an imaging optical element on a side of the surface to be scanned are each formed as the surface in which the tilt angle of the sagittal line changes.

According to a yet further aspect of the present invention, in the optical scanning apparatus, in each of the incident surface and the exit surface of the imaging optical element on the side of the surface to be scanned, a sign for a first difference between the rate of change of the tilt angle of the sagittal line on axis and a rate of change of the tilt angle of the sagittal line off axis in one direction and a sign for a second difference between the rate of change of the tilt angle of the sagittal line on axis and a rate of change of the tilt angle of the sagittal line off axis in the other direction.

According to a yet further aspect of the present invention, in the optical scanning apparatus, the imaging optical element consists of a molded lens.

According to a yet further aspect of the present invention, an image forming apparatus includes the optical scanning apparatus set out in the foregoing, and a photosensitive member disposed at the surface to be scanned.

According to a yet further aspect of the present invention, an image forming apparatus includes the optical scanning apparatus, and a printer controller for converting code data supplied from an external device into an image signal and for inputting the image signal to the optical scanning apparatus.

According to a yet further aspect of the present invention, there is provided an optical scanning apparatus including: a light source unit; an incident optical system for guiding a light beam emitted from the light source unit to a deflecting unit; and an imaging optical system for causing the light beam deflected for scanning on a deflecting surface of the deflecting unit to form an image on a surface to be scanned, in which: the light beam emitted from the light source unit enters the deflecting surface of the deflecting unit in an oblique manner with respect to a plane perpendicular to a rotational axis of the deflecting unit in a sub-scanning section; each of an incident surface and an exit surface of an imaging optical element constituting the imaging optical system is a surface in which a tilt angle of a sagittal line changes from on axis toward off axis in a sub-scanning direction, the tilt angle of the sagittal line indicating a gradient of a surface normal to the sagittal line on a meridian line with respect to a main scanning section; and an absolute value of a difference of a rate of change of the tilt angle of the sagittal line at the same image height between the incident surface of the imaging optical element and the exit surface of the imaging optical element is ⅕ or smaller of an absolute value of a rate of change of the tilt angle of the sagittal line at a most off-axial image height on the respective incident surface and the exit surface of the imaging optical element.

According to a yet further aspect of the present invention, in the optical scanning apparatus, the imaging optical system includes a single imaging optical element.

According to a yet further aspect of the present invention, in the optical scanning apparatus, the imaging optical system includes two imaging optical elements, and the incident surface and the exit surface of an imaging optical element on a side of the surface to be scanned are each formed as the surface in which the tilt angle of the sagittal line changes.

According to a yet further aspect of the present invention, in the optical scanning apparatus, the imaging optical element consists of a molded lens.

According to a yet further aspect of the present invention, an image forming apparatus includes the optical scanning apparatus set out in the foregoing, and a photosensitive member disposed at the surface to be scanned.

According to a yet further aspect of the present invention, an image forming apparatus includes the optical scanning apparatus set out in the foregoing, and a printer controller for converting code data supplied from an external device into an image signal so that the image signal is received by the optical scanning apparatus.

According to the present invention, it is possible to attain an optical scanning apparatus and an image forming apparatus using the same that can appropriately overcome a spot deterioration (spot rotation) due to a curvature of a scanning line and a wavefront aberration deterioration.

Further features of the present invention will become apparent from the following description of exemplary embodiments with reference to the attached drawings.

DESCRIPTION OF THE EMBODIMENTS

The present invention will become apparent from the following description of exemplary embodiments with reference to the attached drawings.

First Embodiment

Figure 1A:
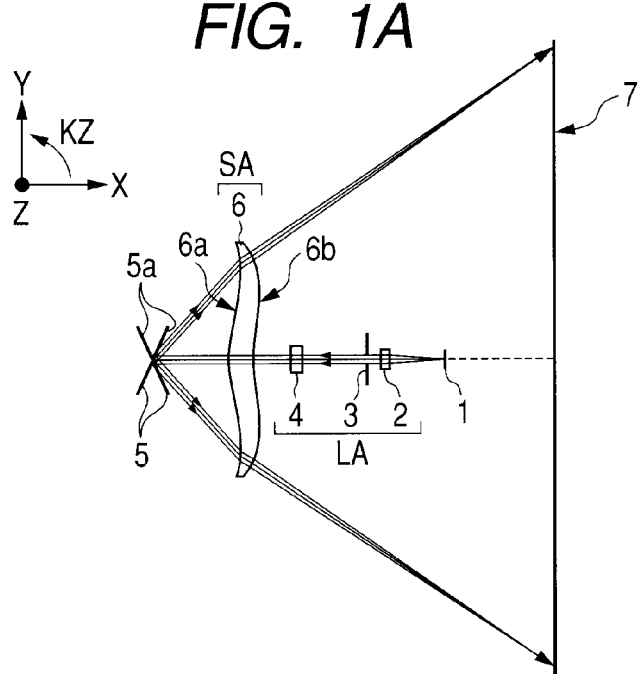
FIG. 1A is a main scanning sectional view of a main part of an optical scanning apparatus according to a first embodiment of the present invention.
Figure 1B:
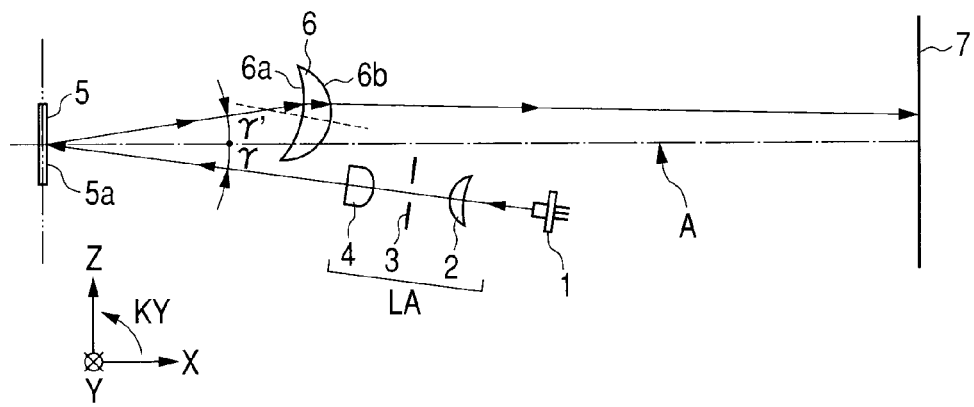
FIG. 1B is a sub-scanning sectional view of the main part of the optical scanning apparatus according to the first embodiment of the present invention.
Figure 1C:
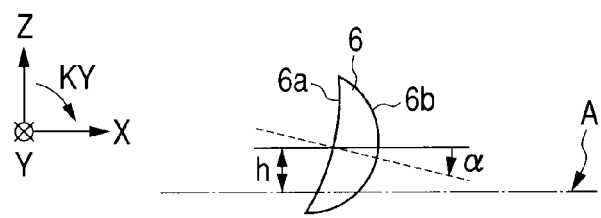
FIG. 1C is a diagram illustrating a decentered state of an imaging lens in the first embodiment of the present invention.

FIG. 1A is a sectional view of a main part of an optical scanning apparatus in a main scanning direction (main scanning sectional view) according to a first embodiment of the present invention. FIG. 1B is a sectional view of the main part of the optical scanning apparatus in a sub-scanning direction (sub-scanning sectional view) according to the first embodiment of the present invention. FIG. 1C is a sectional view of the main part, which is an enlarged view of an imaging lens and its vicinity of FIG. 1B.

Note that, in the description below, the sub-scanning direction (Z direction) is a direction parallel to a rotational axis (oscillating axis) of the deflecting unit. A main scanning section is a section in which the sub-scanning direction (direction parallel to the rotational axis of the deflecting unit) is a normal. A main scanning direction (Y direction) is a direction in which light beams deflected for scanning by the deflecting unit are projected on the main scanning section. A sub-scanning section is a section in which the main scanning direction is a normal. Note that KY and KZ in the diagrams indicate rotation eccentricities with respect to rotation axes that are the Y axis and the Z axis, respectively.

In addition, a curvature radius of a sagittal line (mm) is defined in the section including the normal to the lens surface of the imaging lens. The curvature of the sagittal line is defined as 1/(curvature radius of sagittal line).

In FIGS. 1A and 1B, a light source unit 1 is constituted by a semiconductor laser, for example. A coupling lens (collimator lens) 2 as a condensing optical system converts a divergent light beam emitted from the light source unit 1 into a convergent light beam.

Note that the light beam emitted from the light source unit is converted into a convergent light beam in this embodiment, but the present invention is not limited thereto, and the light beam may be converted into a parallel light beam or a divergent light beam.

An aperture stop 3 restricts the light beam that is converted into the convergent light beam by the coupling lens 2 so as to form a beam shape. A cylindrical lens 4 has a predetermined power (refractive power) only in the sub-scanning direction. In the sub-scanning section, the cylindrical lens causes the light beam that is converted into the convergent light beam by the coupling lens 2 to form a linear image elongated in the main scanning direction on a deflecting surface 5a of an optical deflector 5 as the deflecting unit that is described later. Note that the coupling lens 2 and the cylindrical lens 4 constitute an incident optical system LA. In addition, the coupling lens and the cylindrical lens may be formed integrally as a single anamorphic lens.

The resonance type optical deflector 5 as the deflecting unit has the deflecting surface 5a that moves in a reciprocating manner so as to deflect the light beam emitted from the incident optical system LA for scanning a surface to be scanned 7 in the main scanning direction. The reciprocating movement of the deflecting surface 5a in this embodiment is performed by a resonance drive.

An imaging optical system SA having an fθ-characteristic is constituted by a single imaging lens as an imaging optical element made of a plastic material and causes the light beam deflected for scanning by the deflecting surface 5a of the optical deflector 5 to form an image on the surface to be scanned 7. The surface to be scanned 7 is a surface of a photosensitive drum. The imaging optical system SA corrects an optical face tilt of the deflecting surface 5a of the resonance type optical deflector 5 in the sub-scanning section.

In the main scanning section, a light beam width of the light beam entering the deflecting surface 5a of the optical deflector 5 is smaller than the width of the deflecting surface 5a in the main scanning direction.

Usually, in the case of a rotation polygon mirror having multiple deflecting surfaces, such as a polygon mirror, individual surfaces have different tilt angles in the sub-scanning direction. Therefore, an optical face tilt correction optical system is generally adopted. Note that the resonance type optical deflector is used as the optical deflector in this embodiment, but the present invention is not limited thereto, and a deflecting unit such as a polygon mirror may be used with the same effect.

If the resonance type optical deflector 5 is used, it is not necessary to consider about a difference in tilt amount among the surfaces because there is only one deflecting surface 5a. However, due to an influence of an attachment accuracy error of a magnet 503 illustrated in FIG. 2 that is described later or other factors, there may occur a phenomenon in which the tilt amount in the sub-scanning direction is different according to an angle of deflection. Therefore, in order to achieve a constant beam spot position on the surface to be scanned in a period from the start of scanning to the end of scanning, the deflecting surface 5a and the surface to be scanned 7 may be conjugate with each other in the sub-scanning section.

In addition, if a size of the deflecting surface 5a of the resonance type optical deflector 5 is too large, it is generally difficult to drive the resonance type optical deflector 5 at high speed. If the resonance type optical deflector 5 is used for a laser beam printer or a digital copying machine, it is advantageous that a size of the deflecting surface 5a is as small as possible.

Therefore, in this embodiment, the light beam enters the deflecting surface 5a of the resonance type optical deflector 5 from the front on an imaging lens 6 side in FIG. 1A (front incident). Thus, a width of the deflecting surface 5a of the resonance type optical deflector 5 in the main scanning direction can be minimized so that the resonance type optical deflector 5 can be oscillated at high speed.

In addition, if the front incident is adopted as described above, the light beam entering the deflecting surface 5a of the resonance type optical deflector 5 and the light beam reflected and deflected by the deflecting surface 5a interfere with each other. Therefore, in this embodiment, as illustrated in FIG. 1B, the light beam entering the deflecting surface 5a enters obliquely with a finite angle in the sub-scanning section.

In FIG. 1B, an oblique incident angle γ of 3 degrees is given in the sub-scanning direction, and hence the light beam emitted from the light source unit 1 enters obliquely from the bottom of the diagram. Therefore, the light beam deflected for scanning by the deflecting surface 5a is similarly reflected and deflected with an angle γ' of 3 degrees that is the same as the oblique incident angle in the sub-scanning direction upward in FIG. 1B.

The imaging lens 6 has an anamorphic surface and is disposed above in the sub-scanning direction with a predetermined distance so that the deflected light beam reflected and deflected upward with respect to a reference plane A that includes a deflection point and is perpendicular to the rotational axis (oscillating axis) of the optical deflector may enter. Then, the deflected light beam entering the imaging lens 6 is caused to form a spot-like image on the surface to be scanned 7.

The resonance type optical deflector 5 of this embodiment is driven at a fundamental frequency and a second order harmonic superimposed on the same, so as to achieve deflection for scanning having a wider uniform angular velocity area compared with the sine oscillation type. If the resonance type optical deflector performing sine oscillation is used, it is necessary to use an imaging optical system having an arc sine characteristic for scanning the surface to be scanned at a uniform speed. However, if the imaging optical system having the arc sine characteristic is used for forming the image, a problem that a spot size increases at image end portions compared with the image center portion may arise so that image quality is deteriorated.

Therefore, in this embodiment, the resonance type optical deflector having a 2-degrees-of-freedom system is used for expanding the uniform angular velocity area, and hence an fθ lens can be used, which is similar to the case of using the conventional polygon mirror as the optical deflector.

Figure 2:
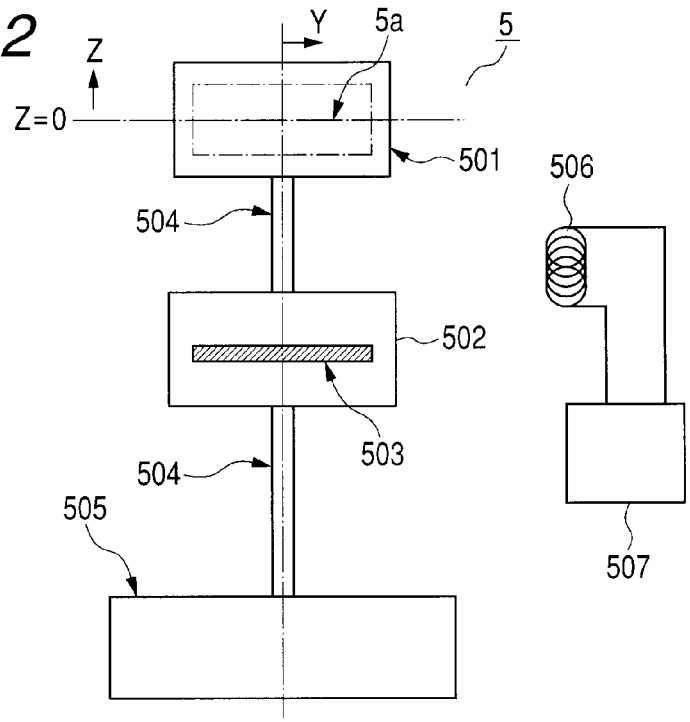
FIG. 2 is a schematic diagram of a main part of a resonance type optical deflector according to the first embodiment of the present invention.

FIG. 2 is a schematic diagram of a main part of the resonance type optical deflector according to the first embodiment of the present invention. In FIG. 2, an element that is the same as the element illustrated in FIGS. 1A to 1C is denoted by the same reference symbol. In the resonance type optical deflector 5 of this embodiment, the drive control unit 507 controls the drive unit 506 so that a system including multiple movable elements (oscillators) 501 and 502 and torsion springs 504 is oscillated at the fundamental frequency and a frequency of an integral multiple of the same simultaneously. In this case, amplitudes and phases of the movable elements 501 and 502 driven at the fundamental frequency and the frequency of the integral multiple of the same are variously changed, and hence various drives can be performed. Note that the structure illustrated in FIG. 2 includes the deflecting surface 5a, the magnet 503, a support portion 505 and the drive control unit 507.

In this embodiment, an error in uniform angular velocity of the resonance type optical deflector is corrected by the imaging lens 6. The resonance type optical deflector is used as the optical deflector in this embodiment, but the effect of this embodiment is not limited thereto. This embodiment is also effective in the optical scanning apparatus using a polygon mirror.

Table 1-1 and Table 1-2 show characteristics of the optical system of the optical scanning apparatus according to this embodiment.

TABLE 1-1

| Wavelength, refractive index | | |
|---|---|---|
| Working wavelength | λ (nm) | 790 |
| Lens material | | |
| Scanning lens | | |
| Refractive index | n | 1.52397 |
| Arrangement | | |
| Laser incident angle (degrees) | | 0 |
| Light beam maximum exit angle (degrees) | | 49.96 |
| Deflector rotation center (mm) | Main scanning | 0 |
| | Sub-scanning | 0 |
| Distance between deflection reference point and toric lens | | 25.52 |
| Toric lens center thickness | | 8.05 |
| Toric lens eccentricity (shift in Z direction) amount: n | | 1.34 |
| Toric lens rotation (about Y axis) eccentricity amount: KY | | 83' |
| Distance between deflection reference point and surface to be scanned | | 138.01 |
| Effective scanning width (mm) | | ±107 |

TABLE 1-2

| | Scanning lens aspherical coefficient | | | | |
|---|---|---|---|---|---|
| | First surface | Second surface | | First surface | Second surface |
| R | 3.55615E+01 | 4.92540E+01 | M2_1 | 1.34095E−05 | 1.28092E−05 |
| K | −1.23432E+01 | −2.42645E+01 | M4_1 | −5.34080E−08 | −4.07841E−08 |
| B4 | −4.35911E−06 | −6.52880E−06 | M6_1 | 1.50750E−11 | 1.77432E−11 |
| B6 | 2.07743E−09 | 4.30217E−09 | M8_1 | −6.17246E−15 | −8.28542E−16 |
| B8 | −3.87888E−14 | −2.57855E−12 | M10_1 | — | −2.09452E−17 |
| B10 | −7.31263E−17 | 5.42860E−16 | A12_1 | — | 4.09332E−21 |
| B12 | −1.70701E−19 | 8.01829E−19 | A14_1 | — | 3.45060E−24 |
| B14 | −6.38736E−23 | −6.68279E−22 | A16_1 | — | — |
| B16 | 4.72174E−26 | 1.15195E−25 | | | |
| r | −1.01001E+01 | −7.41428E+00 | | | |
| D2 | 3.73123E−04 | 2.37359E−04 | | | |
| D4 | −1.01400E−06 | −6.67407E−07 | | | |
| D6 | 2.46888E−09 | 1.65726E−09 | | | |
| D8 | −4.19861E−12 | −2.55657E−12 | | | |
| D10 | 4.23204E−15 | 2.21838E−15 | | | |
| D12 | −2.16911E−18 | −9.68281E−19 | | | |
| D14 | 3.92220E−22 | 1.63569E−22 | | | |
| D16 | 2.45905E−26 | −1.57442E−27 | | | |

Figure 3:
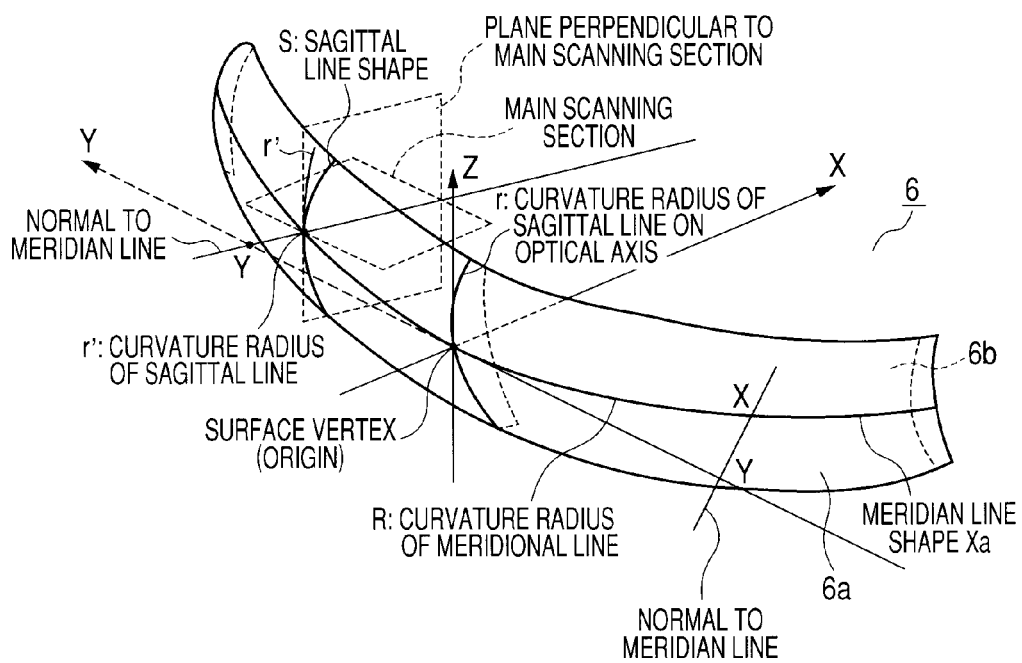
FIG. 3 is a diagram illustrating a surface shape of the imaging lens according to the first embodiment of the present invention.

FIG. 3 illustrates a conceptual diagram of a lens surface of the imaging lens 6 according to the first embodiment of the present invention.

The meridian line shapes of an incident surface 6a and an exit surface 6b of the imaging lens 6 are defined by aspheric shapes that can be expressed as functions of up to 16th order. As illustrated in FIG. 3, an intersection of each lens surface and the optical axis is regarded as an origin, the optical axis direction is regarded as the X axis, an axis orthogonal to the optical axis in the main scanning section is regarded as the Y axis, and an axis orthogonal to the optical axis in the sub-scanning section is regarded as the Z axis. Then, a cutting plane line of the X-Y plane and a curved surface is defined as the meridian line, and the cutting plane line of the curved surface with the X-Z plane in the direction orthogonal to the meridian line, is defined as the sagittal line. In this case, a meridian line shape Xa in the meridian line direction corresponding to the main scanning direction (Y direction) is expressed by the following expression.

$$Xa = \frac{Y^2/R}{1 + \sqrt{1 - (1+K)(Y/R)^2}} + \sum_{i=2}^{8} B_{2i} Y^{2i} \quad (a)$$

In this expression, R represents a curvature radius of the meridian line, and K and $B_2$ to $B_{16}$ represent aspherical coefficients. In addition, a sagittal line shape S corresponding to the sub-scanning direction (Z direction) is expressed by the following expression.

$$S = \frac{Z^2/r'}{1 + \sqrt{1 - (1+Ks)(Z/r')^2}} + \sum_{i,j} M_{i,j} Y^i Z^j \quad (b)$$

S represents a sagittal line shape defined in the vertical plane including the normal to the lens surface on the normal to the meridian line at each position Y in the meridian line direction. In this expression, r' represents a curvature radius (curvature radius of sagittal line) in the sub-scanning direction at the surface coordinate Y in the main scanning direction and is expressed by the following expression.

$$r' = \frac{1}{1/r + \sum_{i=1}^{8} D_{2i} Y^{2i}} \quad (c)$$

The second term of the expression (b) is a sagittal line aspheric component, and Mij means a coefficient of the aspheric term of the i-th power of Y and the j-th power of Z. Each of the incident surface 6a and the exit surface 6b of the imaging lens 6 in this embodiment is constituted by a surface in which the tilt angle of the sagittal line changes.

Here, the "surface in which the tilt angle of the sagittal line changes" is defined as a surface in which a gradient of the surface normal to the sagittal line with respect to the main scanning section on the meridian line changes in the sub-scanning direction from on axis toward off axis in the main scanning direction. Further, the "surface in which the tilt angle of the sagittal line changes" means a surface in which curvature centers of the sagittal lines of the lens surfaces are not located on the same plane. For instance, in the expression (b), the surface in which the constant Mi_1 has a value is the surface in which the tilt angle of the sagittal line changes.

Next, the principle of corrections of the curvature of the scanning line and the spot rotation by the surface in which the tilt angle of the sagittal line changes is described.

When the curvature of the scanning line is to be corrected, a tilt amount of the sagittal line at a passing position of each light beam (hereinafter also referred to as "sagittal line tilt amount" simply) is set appropriately so that an irradiation position on the surface to be scanned can be controlled and the curvature of the scanning line can be corrected. Note that the tilt angle of the sagittal line (sagittal line tilt amount) is defined as an angle between the surface normal to the sagittal line and the main scanning section (XY section) in the sub-scanning direction.

The "surface normal to the sagittal line" is defined as the normal to the lens surface on the meridian line. The "surface normal to the sagittal line" is the "normal to the meridian line" in FIG. 3.

Here, as an indicator for quantification of the spot rotation, a difference in wavefront aberration in a 45-degree azimuth direction (hereinafter referred to as 45-degree astigmatism) is defined. The spot rotation occurs when the wavefront aberration in an azimuth of ±45 degrees loses its balance.

Figure 4:
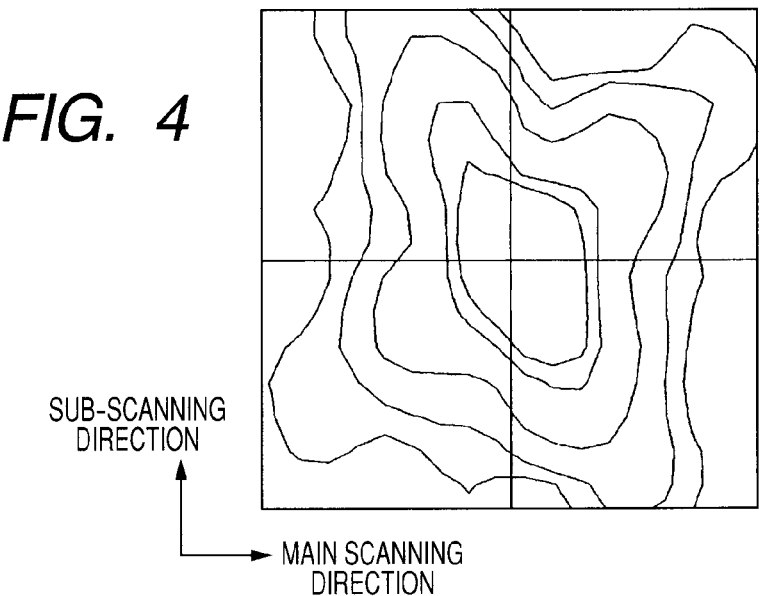
FIG. 4 is a diagram illustrating a spot rotation in the first embodiment of the present invention.
Figure 5A:
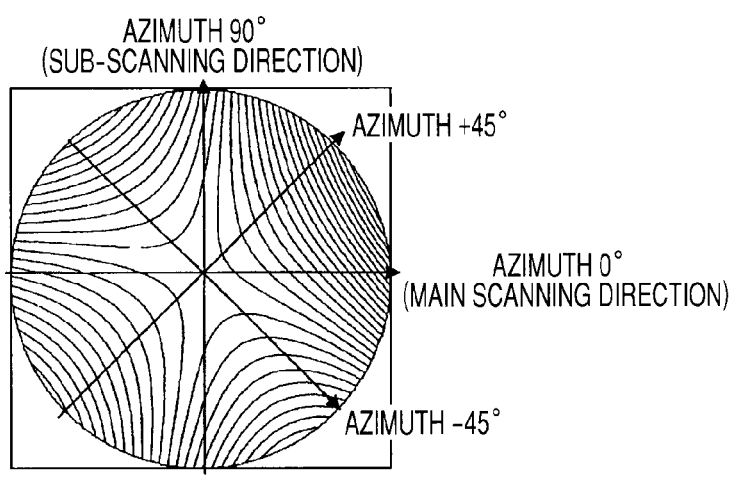
FIG. 5A is a diagram illustrating a wavefront aberration contour map and azimuth directions on a pupil in the first embodiment of the present invention.

FIG. 4 illustrates the spot shape in the case where the spot rotation occurs. FIG. 5A illustrates a wavefront aberration on the pupil that is normalized to be a unit circle in the state where the spot rotation illustrated in FIG. 4 occurs, as a contour map.

Figure 5B:
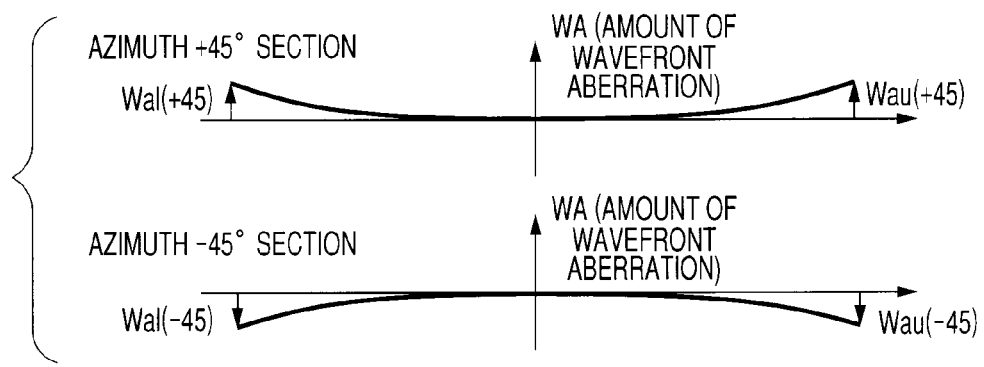
FIG. 5B is a diagram illustrating a wavefront aberration in ±45-degree azimuth directions in the first embodiment of the present invention.

As illustrated in FIG. 5A, the main scanning direction is regarded as an azimuth of 0 degrees, the sub-scanning direction is regarded as an azimuth of 90 degrees, and the mid direction therebetween having an azimuth of ±45 degrees is considered. FIG. 5B illustrates sections in the directions having an azimuth of 45 degrees and an azimuth of −45 degrees of FIG. 5A.

As illustrated in FIG. 5B, wavefront aberrations of the two marginal light beams in the azimuths are denoted by WAu and WAl, respectively, and a wavefront aberration flare component WAh is expressed by the following expression.

$$WAh=(WAu+WAl)/2$$

When the wavefront aberration flare components in the direction having the azimuth of ±45 degrees are respectively denoted by WAh (+45 degrees) and WAh (−45 degrees), a 45-degree astigmatism WAas (±45 degrees) is defined by the following expression.

$$WAas(\pm 45 \text{ degrees})=WAh(+45 \text{ degrees})-WAh(-45 \text{ degrees})$$

If the 45-degree astigmatism is zero, it can be said that the spot rotation does not occur. In order to correct the spot rotation, it is necessary to control a rate of change of the sagittal line tilt amount in the pupil at the light beam passing position on the incident surface 6a and the exit surface 6b of the imaging lens 6 in each scanning field angle. The difference in wavefront aberration in the 45-degree azimuth direction changes in proportion to a rate of change of the sagittal line tilt amount in the meridian line direction in the pupil on the incident surface 6a and the exit surface 6b of the imaging lens 6 in each scanning field angle.

Figure 6A:
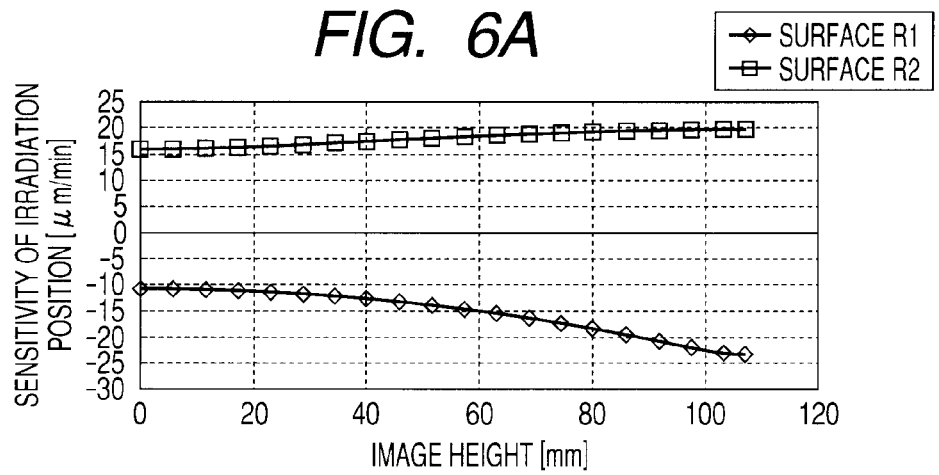
FIG. 6A is a graph illustrating sensitivity of a sagittal line tilt amount with respect to an irradiation position in a sub-scanning direction in the first embodiment of the present invention.
Figure 6B:
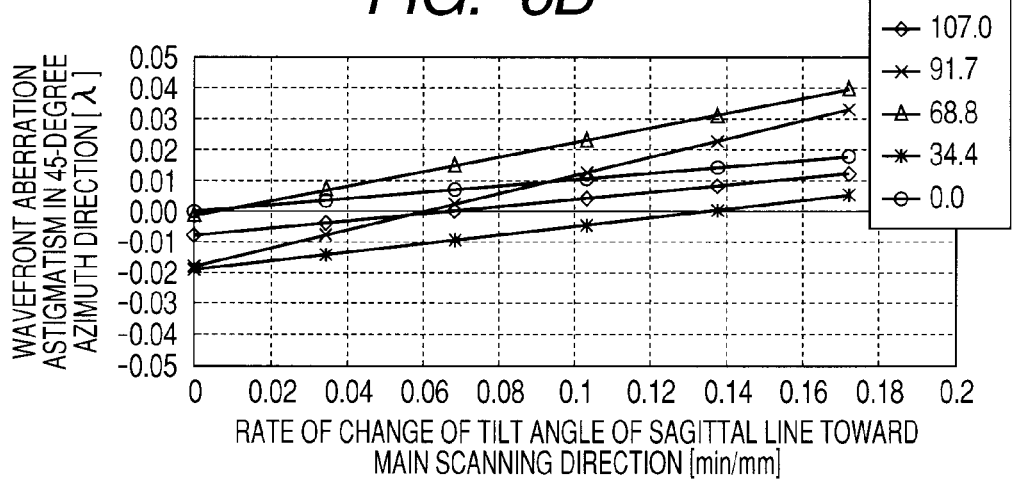
FIG. 6B is a graph illustrating a relationship between a rate of change of the sagittal line tilt amount and astigmatism in wavefront aberration in a 45-degree azimuth direction in the first embodiment of the present invention.
Figure 6C:
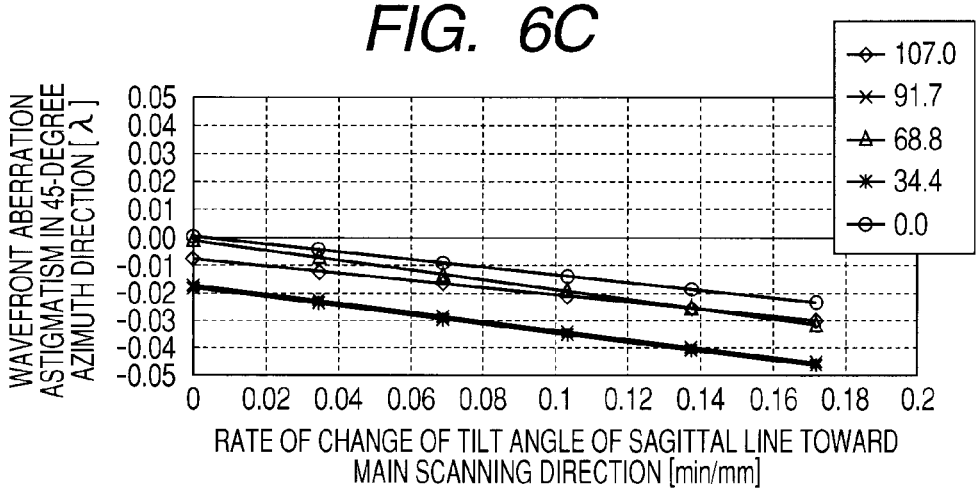
FIG. 6C is a graph illustrating a relationship between a rate of change of the sagittal line tilt amount and a difference in wavefront aberration in the 45-degree azimuth direction in the first embodiment of the present invention.

FIGS. 6A, 6B and 6C are graphs in which the 45-degree astigmatism is plotted when the rate of change of the tilt angle of the sagittal line (rate of change of the sagittal line tilt amount) is changed from the state of this embodiment. It is understood from those graphs that the 45-degree astigmatism changes in proportion to the rate of change of the tilt angle of the sagittal line.

Here, the rate of change of the tilt angle of the sagittal line (rate of change of the sagittal line tilt amount) is a rate of change of the tilt angle of the sagittal line per unit length in the meridian line direction (Y direction) at an arbitrary light beam passing position.

Specifically, the rate of change of the tilt angle of the sagittal line corresponds to a first order differential value with respect to Y of the coefficient in the Z1-th order term constituted by a function of Y in the expression (b).

Therefore, in order to correct the 45-degree astigmatism, the shapes only need to be set to generate the 45-degree astigmatism so that the rate of change of the sagittal line tilt amount in the pupil on the incident surface 6a and the exit surface 6b of the imaging lens 6 in each scanning field angle is canceled by the 45-degree astigmatism generated by the sub-scanning oblique incident.

As described above, the curvature of the scanning line can be corrected by appropriately setting the sagittal line tilt amount at the light beam passing position on the incident surface 6a and the exit surface 6b of the imaging lens 6 in each scanning field angle. In addition, the spot rotation (45-degree astigmatism) can be corrected by appropriately setting the rate of change of the tilt angle of the sagittal line (rate of change of the sagittal line tilt amount) in the pupil on the incident surface 6a and the exit surface 6b of the imaging lens 6 in each scanning field angle.

However, in general, both the change of the sagittal line tilt amount for correcting the curvature of the scanning line and the change of the sagittal line tilt amount for correcting the 45-degree astigmatism cannot be achieved by a single sagittal line tilt surface.

If two sagittal line tilt surfaces are used, both the curvature of the scanning line and the 45-degree astigmatism can be corrected. A sagittal line tilt amount change for correcting the both can be set uniquely based on sensitivity of the irradiation position to the sagittal line tilt amount change and sensitivity of variation of the 45-degree astigmatism to the rate of change of the sagittal line tilt amount change of the two surfaces described above.

As a result, the incident surface and the exit surface of the single imaging lens 6 only need to have the same sign of the difference A between the axial tilt angle of the sagittal line indicating a tilt of the surface normal to the sagittal line with respect to the main scanning section on the meridian line and the off-axial tilt angle of the sagittal line indicating a tilt of the surface normal to the sagittal line with respect to the main scanning section on the meridian line.

In addition, the absolute value of a difference in rate of change of the tilt angle of the sagittal line in the same image height between the incident and exit surfaces of the single imaging lens 6 is set to ⅕ or smaller of the absolute value of the rate of change of the tilt angle of the sagittal line at the most off-axial image height (34 mm) on the incident and exit surfaces of the imaging lens 6, and hence the curvature of the scanning line and the 45-degree astigmatism can be corrected very appropriately.

The absolute value of the difference in rate of change of the tilt angle of the sagittal line at the same image height between the incident and exit surfaces of the imaging lens 6 is 3 min/mm or smaller over the entire range of the image height.

The absolute value of the rate of change of the tilt angle of the sagittal line at the most off-axial image height (34 mm) on the incident surface of the imaging lens 6 is 20 min/mm.

The absolute value of the rate of change of the tilt angle of the sagittal line at the most off-axial image height (34 mm) on the exit surface of the imaging lens 6 is 22 min/mm.

The image height means a position in the main scanning direction on the surface to be scanned.

In addition, the incident and exit surfaces of the single imaging lens 6 are configured to make the rate of change of the tilt angle of the sagittal line that changes in the sub-scanning direction from on axis toward off axis to have the same sign, and hence the curvature of the scanning line and the 45-degree astigmatism can be corrected very appropriately.

In this embodiment, the oblique incident direction of the light beam that enters the deflecting surface of the deflecting unit in an oblique manner with respect to the plane perpendicular to the rotational axis of the deflecting unit in the sub-scanning section is negative (downward direction) as illustrated in FIG. 1B. Therefore, the value of the difference A only needs to be negative.

In this embodiment, a case is described where the light beam enters the deflecting surface of the deflecting unit in an oblique manner from the bottom (negative) with respect to the plane perpendicular to the rotational axis of the deflecting unit in the sub-scanning section.

In the present invention, similar consideration can be taken in the case where the light beam enters the deflecting surface of the deflecting unit in an oblique manner from above (positive) with respect to the plane perpendicular to the rotational axis of the deflecting unit in the sub-scanning section.

If the oblique incident direction of the light beam that enters the deflecting surface of the deflecting unit in an oblique manner with respect to the plane perpendicular to the rotational axis of the deflecting unit in the sub-scanning section is positive (upward direction), the value of the difference A only needs to be positive.

FIG. 6A illustrates sensitivity of the irradiation position with respect to the sagittal line tilt amount at each scanning field angle on each surface. In addition, FIGS. 6B and 6C illustrate relationships between the rate of change of the sagittal line tilt amount in the main scanning direction and the 45-degree astigmatism on the individual surfaces (R1 surface and R2 surface), respectively.

As understood from FIG. 6A, sensitivity of the irradiation position in the sub-scanning direction has different signs between the incident surface 6a (R1 surface) and the exit surface 6b (R2 surface) when they are tilted in the same direction.

In addition, as understood from FIGS. 6B and 6C, astigmatism in the wavefront aberration in the 45-degree azimuth direction changes in opposite direction between the incident surface 6a (R1 surface) and the exit surface 6b (R2 surface) when they are changed at the same rate of change of the sagittal line tilt amount.

Therefore, if the incident surface 6a (R1 surface) and the exit surface 6b (R2 surface) are tilted in the same direction while the rate of change of the tilt angle of the sagittal line (rate of change of the sagittal line tilt amount) is changed, both the astigmatism in the wavefront aberration in the 45-degree azimuth direction and the curvature of the scanning line can be corrected appropriately without changing the irradiation position largely.

Figure 7A:
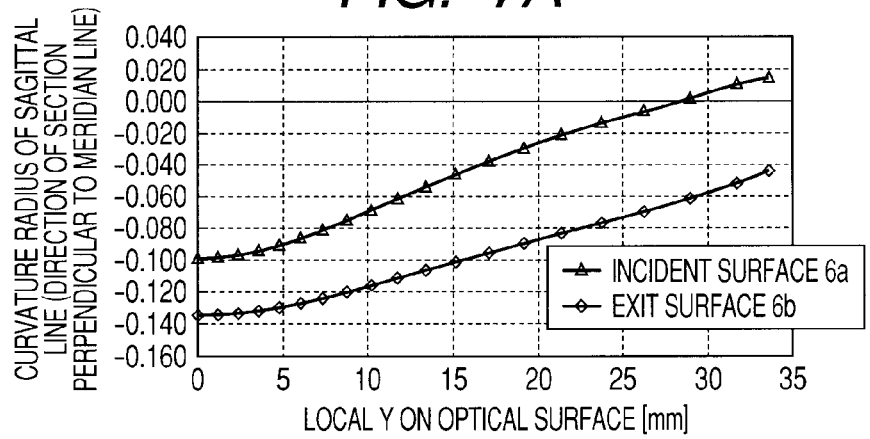
FIG. 7A is a graph illustrating a sagittal line shape of the imaging lens according to the first embodiment of the present invention.

FIG. 7A is a graph in which the changes in curvature radii of the sagittal line on the incident surface 6a and the exit surface 6b of the imaging lens 6 in this embodiment are plotted. In FIG. 7A, the horizontal axis represents a Y coordinate of each lens surface, and the vertical axis represents the curvature radius of the sagittal line in the section orthogonal to the meridian line.

The imaging lens 6 of this embodiment has a meniscus shape as the axial (Y=0) sagittal line sectional shape that is concave toward the deflecting unit side. In that shape, the curvature radius of the sagittal line decreases from on axis toward off axis (changes to be a biconvex shape).

In other words, the incident surface 6a and the exit surface 6b of the imaging lens 6 of this embodiment are both sagittal line curvature surfaces in which the curvature radius of the sagittal line changes according to a position in the main scanning direction, and the curvature radius of the sagittal line is reversed in at least one surface (incident surface 6a in this embodiment).

In addition, the imaging lens 6 of this embodiment has a so-called laterally elongated "m" shape (having multiple inflection points in the meridian line curvature) for downsizing the imaging lens. By means of pending of the sagittal line, uniformity is secured in the sub-scanning image plane and the lateral magnification in the sub-scanning direction.

In other words, each of the incident surface 6a and the exit surface 6b of the imaging lens 6 in this embodiment has a noncircular shape in the main scanning section and has multiple inflection points.

Figure 7B:
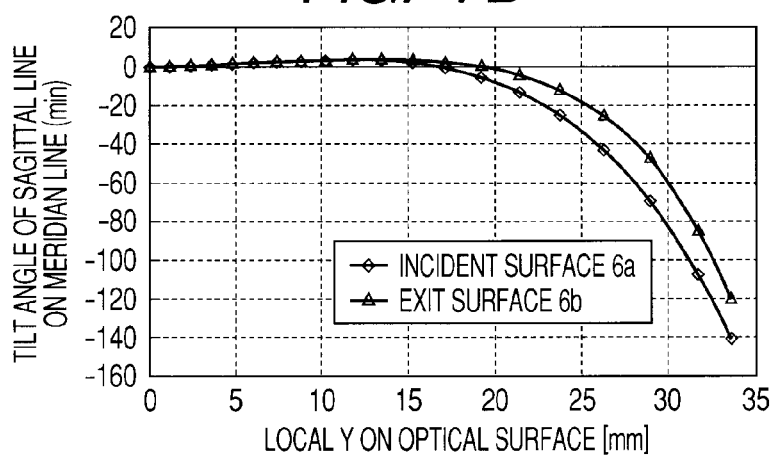
FIG. 7B is a graph illustrating a sagittal line shape of the imaging lens according to the first embodiment of the present invention.

FIG. 7B is a graph illustrating changes in sagittal line tilt amount on the meridian line of the incident surface 6a and the exit surface 6b of the imaging lens 6, in which the horizontal axis represents the Y coordinate on each lens surface, and the vertical axis represents the sagittal line tilt amount in each position.

The off-axial tilt angle of the sagittal line on the incident surface 6a of the single imaging lens 6 decreases monotonously outside 50%-image height on the incident surface in the main scanning direction, and the off-axial tilt angle of the sagittal line on the exit surface 6b of the single imaging lens 6 decreases monotonously outside 50%-image height (15 mm) on the exit surface in the main scanning direction. Thus, in this embodiment, the curvature of the scanning line and the 45-degree astigmatism can be corrected appropriately so as to solve the problems.

In this embodiment, the oblique incident direction in the sub-scanning section is the downward direction (negative), and hence the off-axial tilt angle of the sagittal line is caused to decrease monotonously outside the 50%-image height.

However, if the oblique incident direction in the sub-scanning section is the upward direction (positive), the off-axial tilt angle of the sagittal line on the incident surface of the single imaging lens is caused to increase monotonously outside the 50%-image height on the incident surface in the main scanning direction, and the off-axial tilt angle of the sagittal line on the exit surface of the single imaging lens is caused to increase monotonously outside the 50%-image height on the exit surface in the main scanning direction. Thus, the curvature of the scanning line and the 45-degree astigmatism can be corrected appropriately so as to solve the problems.

Figure 7C:
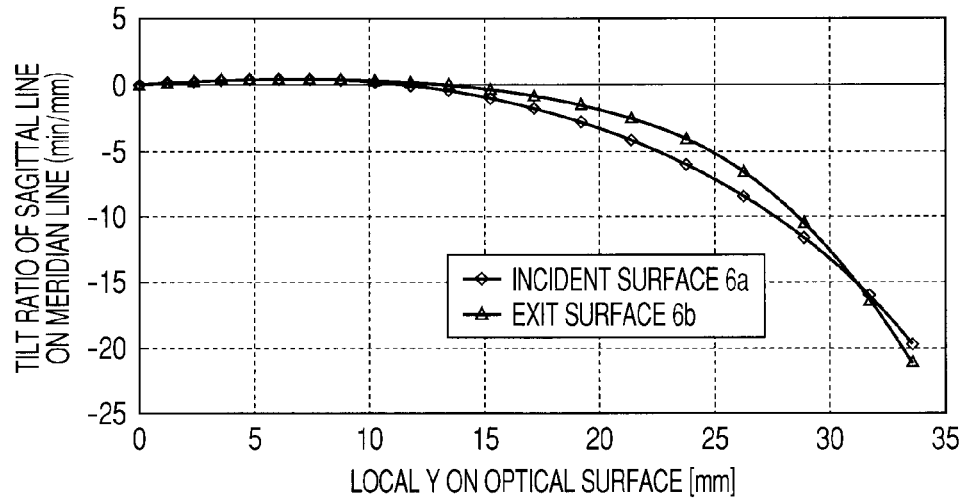
FIG. 7C is a graph illustrating a sagittal line shape of the imaging lens according to the first embodiment of the present invention.

FIG. 7C is a graph illustrating a rate of change of the sagittal line tilt amount in the Y direction on the meridian line in the incident surface 6a and the exit surface 6b of the imaging lens 6. As illustrated in FIG. 7C, the curvature of the scanning line and the 45-degree astigmatism can be corrected more easily if the rate of change of the sagittal line tilt amount in the Y direction changes continuously.

Thus, in this embodiment, the surface normal to the sagittal line on the meridian line changes as illustrated in FIGS. 7A to 7C, and the gradient of the surface normal to the sagittal line changes from on axis toward off axis in the main scanning direction.

Further, the rates of change of the tilt angle of the sagittal line (rates of change of the sagittal line tilt amount) changing from on axis toward off axis in the sub-scanning direction have the same sign between the incident surface 6a and the exit surface 6b of the single imaging lens 6, and hence the curvature of the scanning line and the 45-degree astigmatism can be corrected appropriately.

In addition, on the incident surface 6a and the exit surface 6b of the single imaging lens 6, the rate of change of the tilt angle of the sagittal line changing in the sub-scanning direction outside the 50%-image height (15 mm) in the main scanning direction changes monotonously. Therefore, the curvature of the scanning line and the 45-degree astigmatism can be corrected appropriately.

In this embodiment, the oblique incident direction in the sub-scanning section is the downward direction (negative), and hence the rate of change of the tilt angle of the sagittal line is caused to decrease monotonously outside the 50%-image height.

However, if the oblique incident direction in the sub-scanning section is the upward direction (positive), the rate of change of the tilt angle of the sagittal line changing in the sub-scanning direction outside the 50%-image height in the main scanning direction is caused to increase monotonously on the incident surface 6a and the exit surface 6b of the single imaging lens 6, and hence the curvature of the scanning line and the 45-degree astigmatism can be corrected appropriately.

Figure 8:
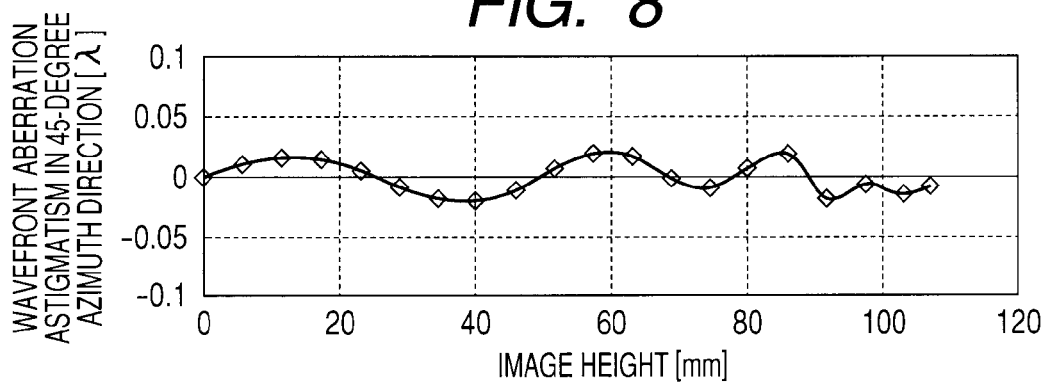
FIG. 8 is a graph illustrating a difference in wavefront aberration in the 45-degree azimuth direction of the optical scanning apparatus according to the first embodiment of the present invention.

FIG. 8 is a graph in which the 45-degree astigmatism at each image height of the optical scanning apparatus of this embodiment is plotted. It is understood that the 45-degree astigmatism is ±0.05λ or smaller over the entire area of the effective scanning area (±107 mm width), and that the 45-degree astigmatism occurring by the oblique incident structure in the sub-scanning section can be corrected appropriately.

Figure 9:
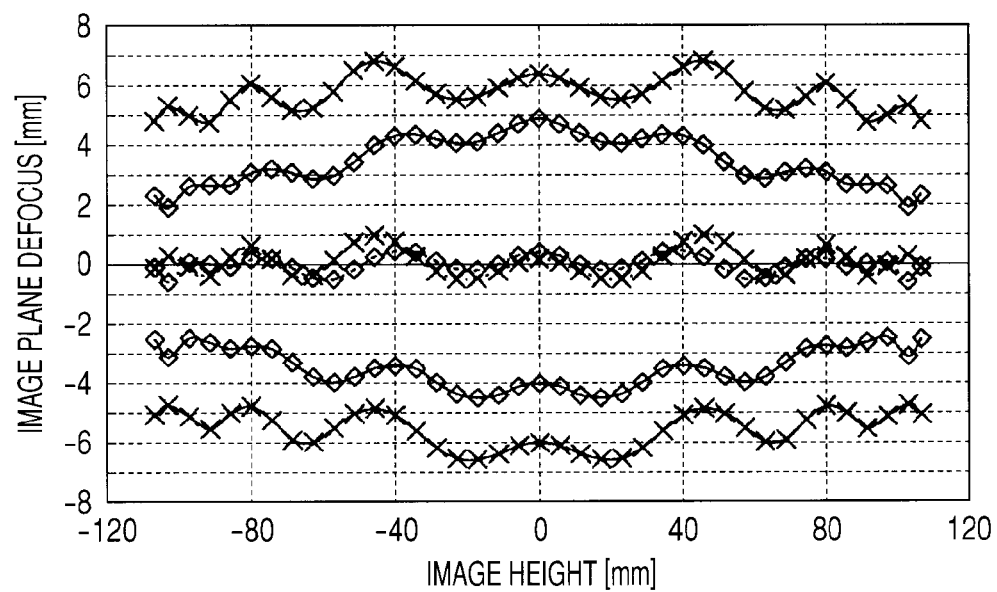
FIG. 9 is a graph illustrating a defocus depth of the optical scanning apparatus according to the first embodiment of the present invention.

FIG. 9 is a graph illustrating a depth of focus (LSF depth) of the optical scanning apparatus of this embodiment. In FIG. 9, a slice level is set to 85 μm in the main scanning direction and to 95 μm in the sub-scanning direction so as to perform calculation.

The distance in the defocus direction on the surface to be scanned for achieving a spot diameter of 85 μm or smaller at every image height in the main scanning direction is ±2 mm. Similarly, the distance in the defocus direction on the surface to be scanned for achieving a spot diameter of 95 μm or smaller at every image height in the sub-scanning direction is ±4.5 mm. Hence, the depth of focus is secured sufficiently.

Figure 10:
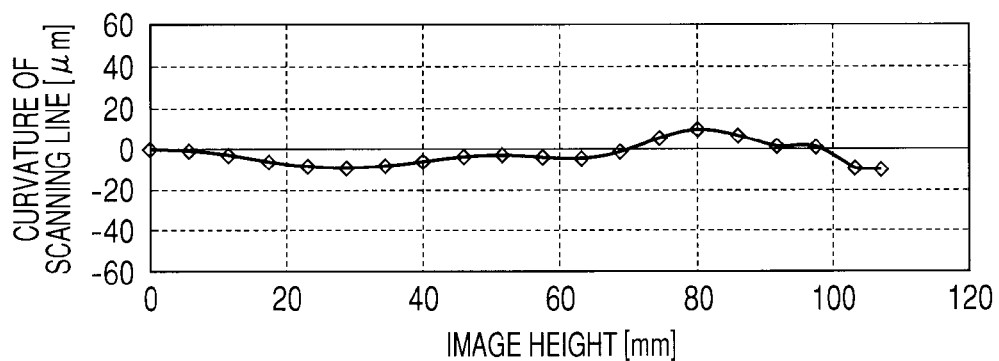
FIG. 10 is a graph illustrating a scanning line of the optical scanning apparatus according to the first embodiment of the present invention.

In addition, FIG. 10 is a graph of the curvature of the scanning line, i.e., a graph in which an arrival position of a principal ray in the sub-scanning direction on the surface to be scanned at each image height is plotted with the axial position set as zero. It is understood that the curvature of the scanning line (linearity of the scanning line) is corrected appropriately as shown in FIG. 10 shows that the peak to peak (P-P) value of the scanning line is 20 μm or smaller.

Figure 11A:
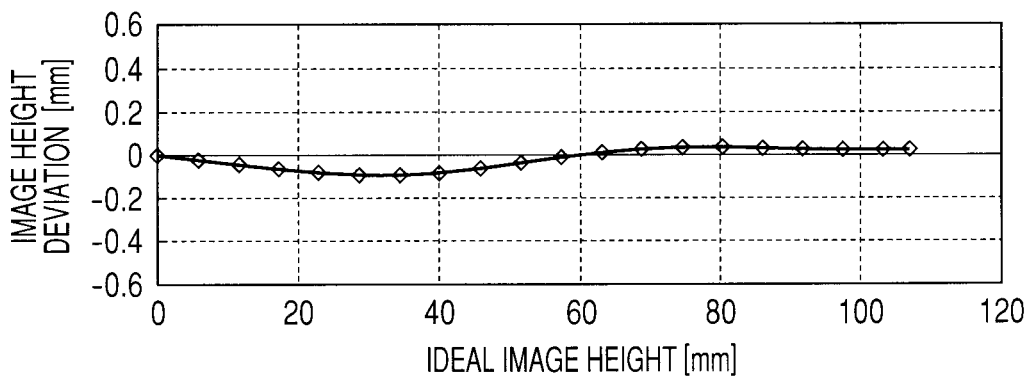
FIG. 11A is a graph illustrating characteristics of the optical scanning apparatus according to the first embodiment of the present invention.
Figure 11B:
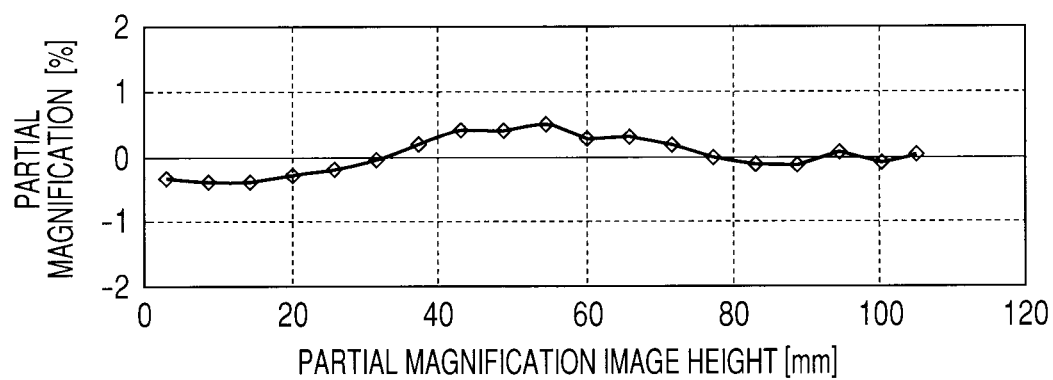
FIG. 11B is a graph illustrating characteristics of the optical scanning apparatus according to the first embodiment of the present invention.
Figure 11C:
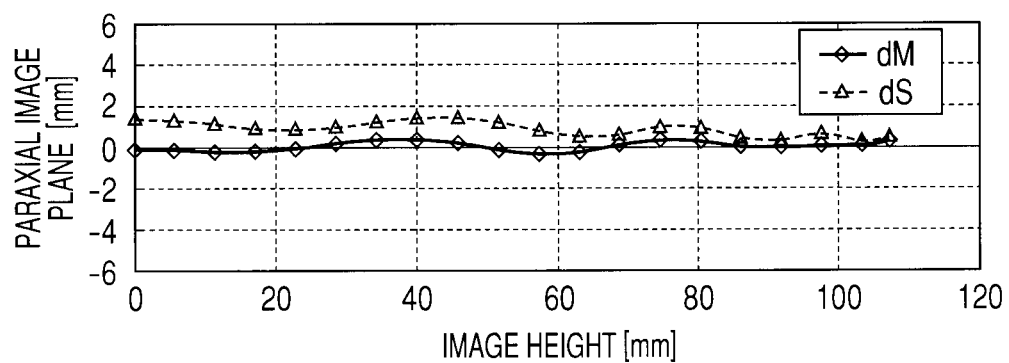
FIG. 11C is a graph illustrating characteristics of the optical scanning apparatus according to the first embodiment of the present invention.

FIGS. 11A, 11B and 11C respectively illustrate other various optical characteristics. FIG. 11A illustrates image height deviation in the main scanning direction, FIG. 11B illustrates partial magnification in the main scanning direction, and FIG. 11C illustrates a paraxial image plane (field curvature). As illustrated in FIGS. 11A, 11B and 11C, it is understood that the paraxial image plane (field curvature) in the main scanning direction, the paraxial image plane (field curvature) in the sub-scanning direction and the partial magnification in the main scanning direction are corrected appropriately.

Figure 12:
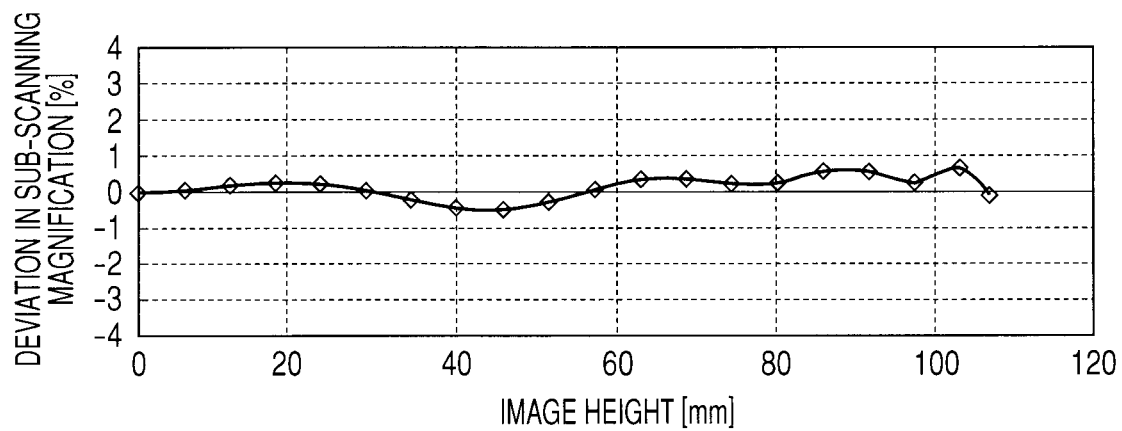
FIG. 12 is a graph illustrating uniformity of lateral magnification in the sub-scanning direction of an imaging optical system in the optical scanning apparatus according to the first embodiment of the present invention.

In addition, FIG. 12 is a graph illustrating uniformity of the lateral magnification of the imaging optical system 6 in the sub-scanning direction at each image height, which illustrates a deviation from the magnification in the off-axial sub-scanning direction with respect to the magnification in the axial sub-scanning direction.

In this embodiment, the curvature radii of the sagittal line on the incident surface 6a and the exit surface 6b of the imaging lens 6 are changed from on axis toward off axis, and hence uniformity (±10% or smaller) in the surface to be scanned in the sub-scanning direction and the lateral magnification in the sub-scanning direction is corrected appropriately, and both are realized.

In this embodiment, the incident surface 6a and the exit surface 6b of the single imaging lens 6 are provided with the surface in which the tilt angle of the sagittal line changes, and hence as to mold the sagittal line tilt imaging lens 6 with high eccentricity sensitivity as a plastic molded lens in which relative misalignment between the incident surface 6a and the exit surface 6b is suppressed. In addition, deterioration in performance due to an assembly error and the like may be reduced further than the case where each of the multiple imaging lenses is provided with the surface in which the tilt angle of the sagittal line changes.

The oblique incident direction of the light beam entering the deflecting surface of the deflecting unit in an oblique manner with respect to the plane perpendicular to the rotational axis of the deflecting unit in the sub-scanning section is the downward direction (negative). Therefore, in the sub-scanning section, the curvature of the scanning line and the 45-degree astigmatism are corrected appropriately by tilting in the negative direction with respect to the plane perpendicular to the rotational axis of the deflecting unit.

Further, in this embodiment, in the sub-scanning section, the optical axis of the imaging lens 6 is shifted upward to the positive side in the Z direction with respect to the normal A to the deflecting surface including the deflection reference point on the deflecting surface of the light beam entering the deflecting surface in an oblique manner from the bottom (negative) direction, and hence the curvature of the scanning line and the 45-degree astigmatism are corrected appropriately.

If the oblique incident direction of the light beam that enters the deflecting surface of the deflecting unit in an oblique manner with respect to the plane perpendicular to the rotational axis of the deflecting unit in the sub-scanning section is the upward direction (positive), the curvature of the scanning line and the 45-degree astigmatism can be corrected appropriately by tilting in the positive direction in the sub-scanning section with respect to the plane perpendicular to the rotational axis of the deflecting unit.

Similarly, if the oblique incident direction in the sub-scanning section is the upward direction (positive), the curvature of the scanning line and the 45-degree astigmatism can be corrected appropriately by shifting the optical axis of the imaging lens 6 downward to the negative side in the Z direction with respect to the normal A to the deflecting surface including the deflection point on the deflecting surface of the light beam entering the deflecting surface from the bottom (positive) direction in an oblique manner.

In other words, if the oblique incident direction in the sub-scanning section is the upward direction (positive), signs of the shift direction of the imaging lens 6 in the Z direction, rotation eccentricity amount about the Y axis, and the sagittal line tilt coefficient (Mi_1) are to be reversed.

Second Embodiment

Figure 13A:
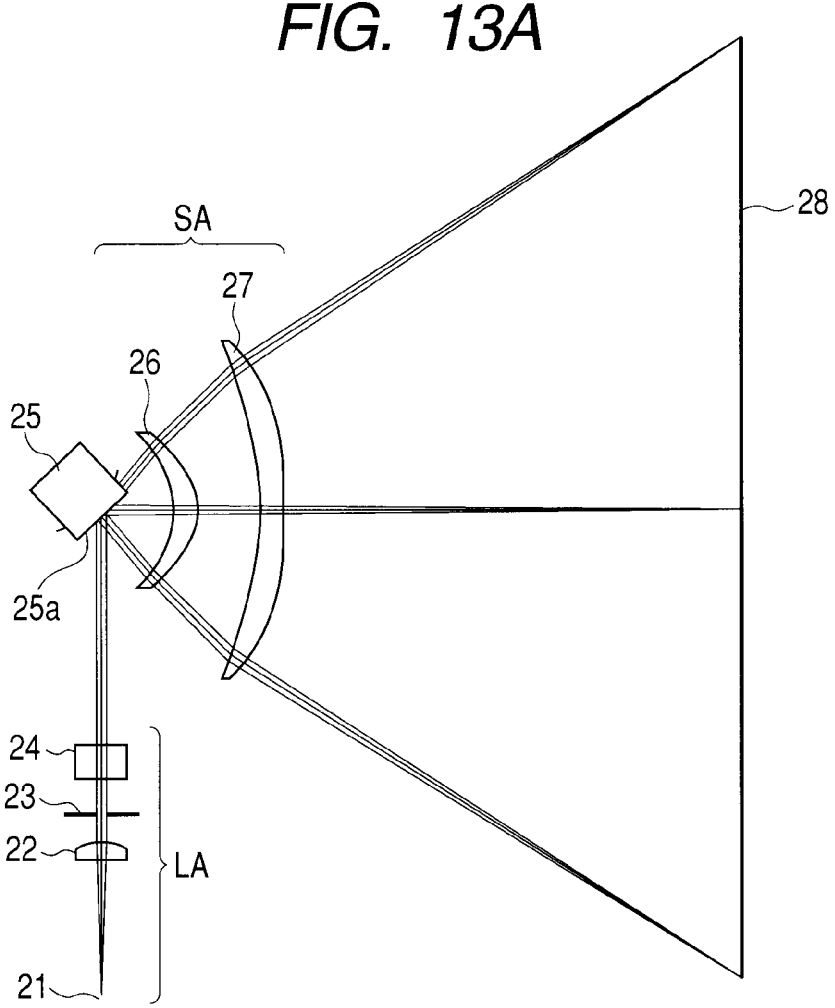
FIG. 13A is a main scanning sectional view of a main part of an optical scanning apparatus according to a second embodiment of the present invention.
Figure 13B:
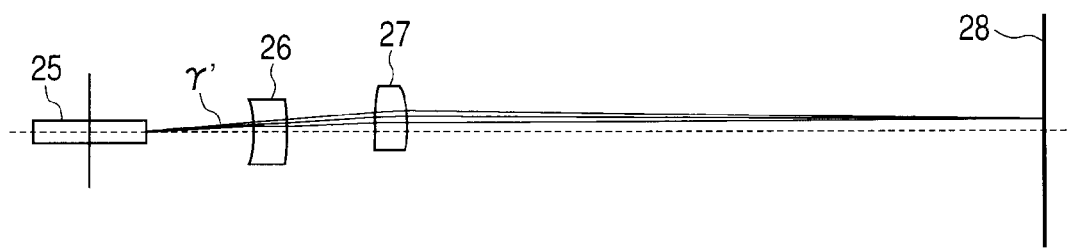
FIG. 13B is a sub-scanning sectional view of the main part of the optical scanning apparatus according to the second embodiment of the present invention.

FIG. 13A is a sectional view (main scanning sectional view) of a main part in the main scanning direction according to a second embodiment of the present invention. Similarly, FIG. 13B is a sectional view (sub-scanning sectional view) of the main part in the sub-scanning direction according to the second embodiment of the present invention. Note that the coordinate axes of X, Y and Z are the same as those in the first embodiment.

This embodiment is different from the first embodiment described above in that a four-face polygon mirror is used as the deflecting unit, and that the imaging optical system having an fθ-characteristic is constituted by two imaging optical elements. In addition, the second embodiment is different from the first embodiment also in that the divergent light beam emitted from the light source unit 1 is converted by the coupling lens (collimator lens) 2 into a parallel light beam.

Note that the oblique incident angle γ of 3 degrees is given in the sub-scanning direction similarly to the first embodiment so that the light beam emitted from the light source unit enters obliquely from the bottom direction. Therefore, the light beam deflected for scanning by the deflecting surface is also reflected and deflected upward similarly with the same angle as the oblique incident angle γ' of 3 degrees in the sub-scanning direction so as to enter the imaging optical system having the fθ-characteristic.

In this embodiment, curvature radii of the sagittal line of an incident surface and an exit surface of a first imaging lens 26 are constant, while an incident surface and an exit surface of a second imaging lens 27 are surfaces in which the curvature radius of the sagittal line changes, and the surface in which the tilt angle of the sagittal line changes is used.

Table 2-1 and Table 2-2 show characteristics of the optical system of the optical scanning apparatus according to this embodiment.

TABLE 2-1

Wavelength, refractive index

| | | |
|---|---|---|
| Working wavelength | λ [nm] | 790 |
| First imaging lens and second imaging lens | | |
| Refractive index | n | 1.52397 |

Arrangement

| | | |
|---|---|---|
| Laser incident angle (degrees) | | 90 |
| Light beam maximum exit angle (degrees) | | 49.96 |
| Rotation center of optical deflector (when deflection reference point (x, y) = (0, 0)) [mm] | X | −5.761 |
| | Y | 4.238 |
| Distance between deflection reference point and first imaging lens [mm] | | 16.9 |
| Center thickness of first imaging lens [mm] | | 5.67 |
| Distance between first imaging lens and second imaging lens [mm] | | 14.58 |
| Center thickness of second imaging lens [mm] | | 5.57 |
| Eccentricity amount of second imaging lens (Z direction shift) [mm] | | 2.05 |
| Distance between deflection reference point and surface to be scanned [mm] | | 149.9 |
| Effective scanning width [mm] | | ±105 |

Figure 14A:
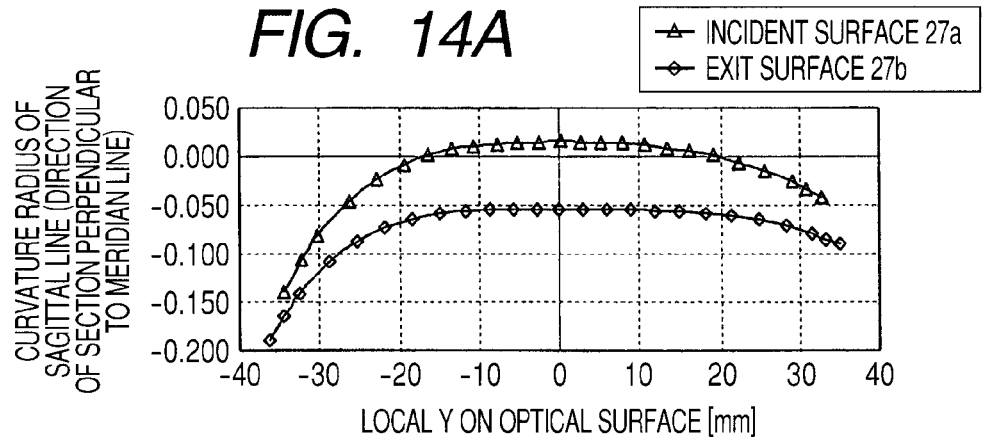
FIG. 14A is a graph illustrating a sagittal line shape of an imaging lens according to the second embodiment of the present invention.
Figure 14B:
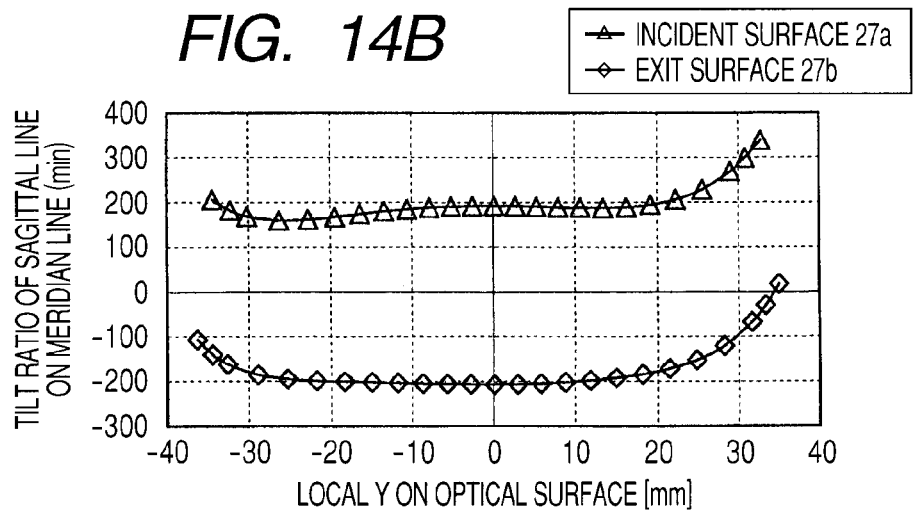
FIG. 14B is a graph illustrating the sagittal line shape of the imaging lens according to the second embodiment of the present invention.
Figure 14C:
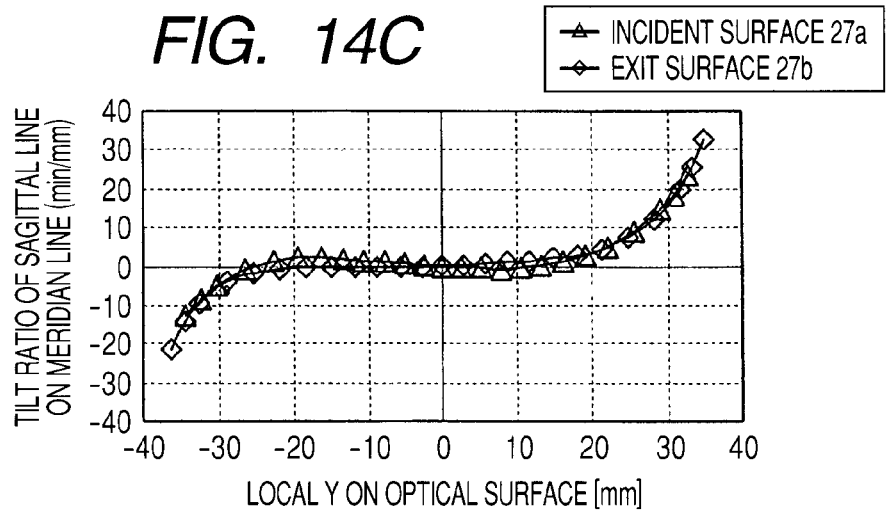
FIG. 14C is a graph illustrating the sagittal line shape of the imaging lens according to the second embodiment of the present invention.

Similarly to the first embodiment, a change in curvature radius of the sagittal line of the second imaging lens 27, a change in tilt angle of the sagittal line (sagittal line tilt amount), and a rate of change of the tilt angle of the sagittal line (sagittal line tilt amount) are illustrated in FIGS. 14A, 14B and 14C.

Figure 15A:
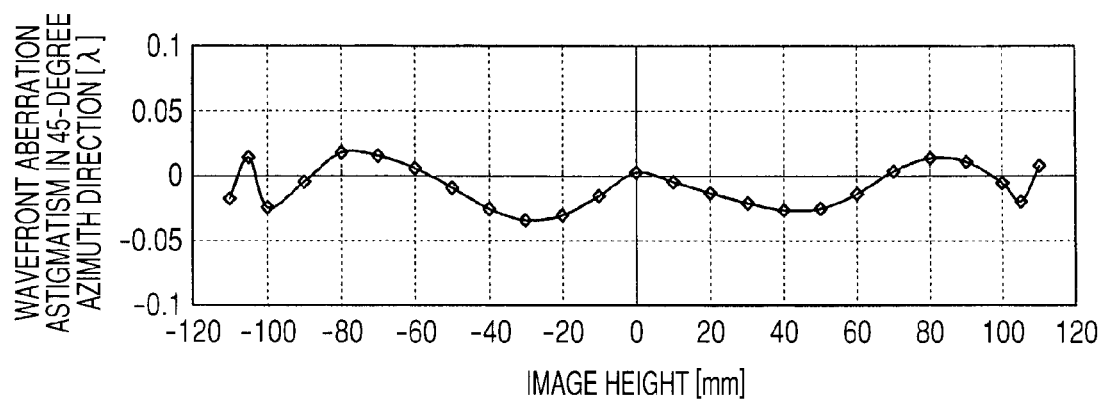
FIG. 15A is a graph illustrating a difference in wavefront aberration in a 45-degree azimuth direction of the optical scanning apparatus according to the second embodiment of the present invention.
Figure 15B:
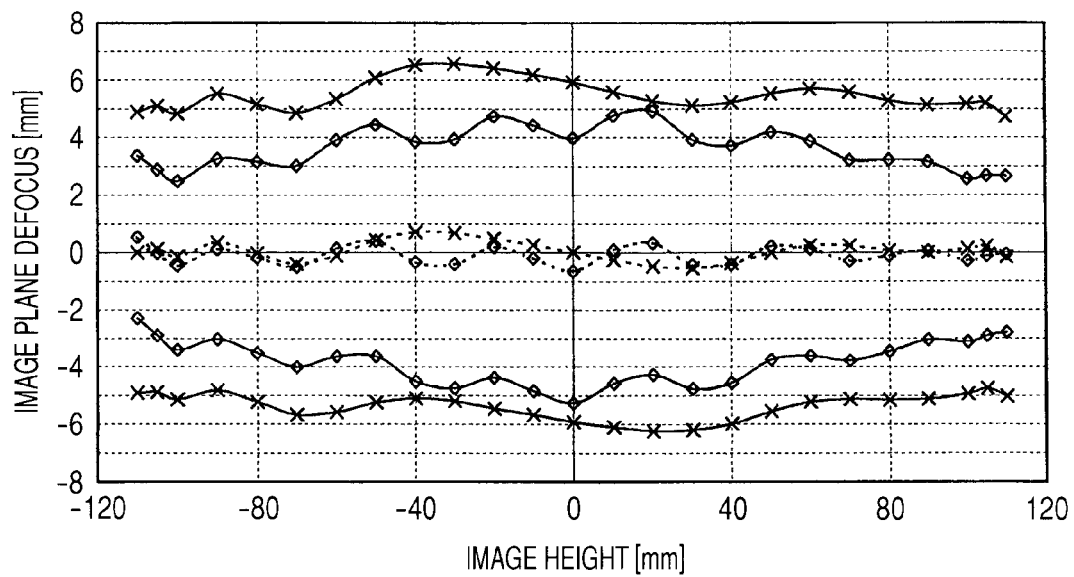
FIG. 15B is a graph illustrating a defocus depth of the optical scanning apparatus according to the second embodiment of the present invention.
Figure 15C:
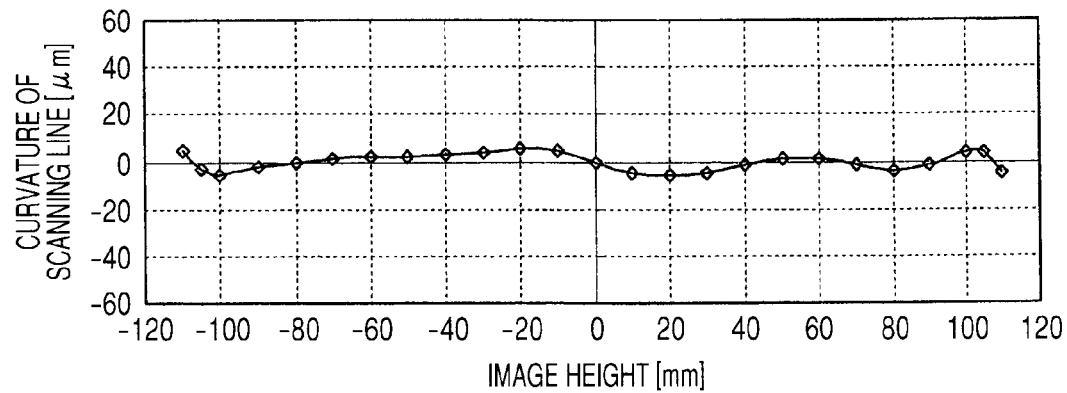
FIG. 15C is a graph illustrating a scanning line of the optical scanning apparatus according to the second embodiment of the present invention.

In addition, various optical characteristics of the optical scanning apparatus are illustrated in FIGS. 15A, 15B and 15C.

As understood from FIG. 14A, a sagittal line sectional shape of the second imaging lens 27 is a biconvex shape in on axis and becomes a meniscus shape with a concave surface facing toward the deflecting unit side as being close to off axis.

The incident surface and the exit surface of the second imaging lens 27 are surfaces in which the tilt angle of the sagittal line changes, and the sagittal line tilt amount (tilt angle of the sagittal line) indicating a gradient of the surface normal to the sagittal line with respect to the main scanning section on the meridian line changes from on axis toward off axis in the sub-scanning direction.

In addition, an absolute value of a difference of the rate of change of the tilt angle of the sagittal line between the incident and exit surfaces of the second imaging lens 27 at the same image height is set to ⅕ or smaller of an absolute value of the rate of change of the tilt angle of the sagittal line at the most off-axial image height (34 mm) on the incident and exit surfaces of the second imaging lens 27, and hence the curvature of the scanning line and the 45-degree astigmatism can be corrected very appropriately.

The absolute value of the difference of the rate of change of the tilt angle of the sagittal line at the same image height

TABLE 2-2

| | Aspherical coefficient | | | | | Aspherical coefficient | |
|---|---|---|---|---|---|---|---|
| | First imaging lens 26 | | Second imaging lens 27 | | | Second imaging lens | |
| | First surface | Second surface | Third surface | Fourth surface | | Third surface | Fourth surface |
| Ru | −2.27184E+01 | −1.55724E+01 | −6.27538E+01 | −2.18470E+02 | M0__1u | 0.055867101 | −0.060223146 |
| Ku | 4.24074E−01 | −3.10121E+00 | −3.56575E+00 | 2.48815E+01 | M2__1u | −1.7152E−05 | 1.77887E−05 |
| B4u | −1.97842E−05 | −9.08802E−05 | 1.88081E−06 | −5.62352E−06 | M4__1u | 5.66863E−08 | −1.46942E−09 |
| B6u | 2.53563E−07 | 2.74837E−07 | −5.87042E−10 | 3.57296E−09 | M6__1u | −1.88006E−11 | 2.5722E−11 |
| B8u | −8.90108E−10 | −5.95002E−10 | −4.13383E−13 | −1.70033E−12 | M8__1u | 2.09819E−14 | −6.21274E−15 |
| B10u | 1.60590E−12 | 6.33980E−13 | 1.78524E−16 | 2.56225E−16 | M10__1u | −5.90984E−18 | 4.66967E−18 |
| Rl | −2.27184E+01 | −1.55724E+01 | −6.27538E+01 | −2.18470E+02 | M0__1l | 0.055867101 | −0.060223146 |
| Kl | 4.24074E−01 | 3.10121E+00 | −3.56575E+00 | 2.48815E+01 | M2__1l | −1.85885E−05 | 7.77349E−06 |
| B4l | −1.97842E−05 | −9.08802E−05 | 1.88081E−06 | −5.62352E−06 | M4__1l | −9.52567E−09 | −1.27302E−08 |
| B6l | 2.63844E−07 | 2.78507E−07 | −2.23134E−10 | 3.66231E−09 | M6__1l | 2.19037E−11 | 1.52636E−11 |
| B8l | −9.28995E−10 | −5.78047E−10 | −2.30741E−13 | −1.60204E−12 | M8__1l | 5.43204E−15 | −4.26594E−15 |
| B10l | 1.68527E−12 | 5.88171E−13 | 6.02801E−17 | 3.52165E−16 | M10__1l | −3.40182E−18 | 4.67498E−18 |
| ru | −1.95465E+01 | −4.00410E+01 | 6.36901E+01 | −1.83599E+01 | M0__4u | | 8.70963E−05 |
| D2u | | | −3.17174E−05 | −3.18131E−06 | M2__4u | | −3.22282E−07 |
| D4u | | | −2.45828E−08 | −2.29760E−08 | M4__4u | | 5.87256E−10 |
| D6u | | | 1.40497E−10 | 4.48866E−11 | M6__4u | | −3.10611E−13 |
| D8u | | | −1.40164E−13 | −1.77632E−14 | M8__4u | | |
| D10u | | | 3.99050E−17 | −2.71065E−18 | M10__4u | | |
| rl | −1.95465E+01 | −4.00410E+01 | 6.36901E+01 | −1.83599E+01 | M0__4l | | 8.70963E−05 |
| D2l | | | −3.17174E−05 | −3.18131E−06 | M2__4l | | −3.22282E−07 |
| D4l | | | −7.66107E−08 | −7.03033E−08 | M4__4l | | 3.53894E−10 |
| D6l | | | 1.86777E−10 | 1.24604E−10 | M6__4l | | −1.16316E−13 |
| D8l | | | −1.55606E−13 | −9.14448E−14 | M8__4l | | |
| D10l | | | 4.61591E−17 | 2.44833E−17 | M10__4l | | |

Note that the suffixes u and l of each coefficient represent coefficients in the area of Y>0 and in the area of Y<0, respectively.

between the incident and exit surfaces of the second imaging lens 27 is 2 min/mm or smaller over the entire range of the image height.

The absolute value of the rate of change of the tilt angle of the sagittal line at the most off-axial image height (34 mm) on the incident surface of the second imaging lens 27 is 20 min/mm.

The absolute value of the rate of change of the tilt angle of the sagittal line at the most off-axial image height (34 mm) on the exit surface of the second imaging lens 27 is 30 min/mm.

In addition, the sign of the difference between the rate of change of the axial tilt angle of the sagittal line and the rate of change of the off-axial tilt angle of the sagittal line is the same in the incident and exit surfaces of the second imaging lens 27.

Therefore, the curvature of the scanning line and the spot rotation can be corrected appropriately.

In addition, as understood from FIG. 14C, in each of the incident and exit surfaces of the second imaging lens 27 on the side of the surface to be scanned, the sign of a first difference between the rate of change of the tilt angle of the sagittal line on axis and the rate of change of the tilt angle of the sagittal line off axis in one direction and the sign of a second difference between the rate of change of the axial tilt angle of the sagittal line and the rate of change of the tilt angle of the sagittal line off axis in the other direction are different from each other.

FIG. 15A is a graph in which astigmatisms in wavefront aberration in the 45-degree azimuth direction at each image height of the optical scanning apparatus of this embodiment is plotted. It is understood that the astigmatism in wavefront aberration in the 45-degree azimuth direction is within ±0.05λ over the entire range of the effective scanning area (±110 mm width) and that the astigmatism in wavefront aberration in the 45-degree azimuth direction generated by the oblique incident in the sub-scanning section can be corrected appropriately.

FIG. 15B is a graph illustrating a depth of focus (LSF depth) of the optical scanning apparatus of this embodiment. In FIG. 15B, a slice level is set to 85 μm in the main scanning direction (optimal design spot diameter is 70 μm) and to 95 μm in the sub-scanning direction (optimal design spot diameter is 80 μm) so as to perform calculation.

The distance in the defocus direction on the surface to be scanned for achieving a spot diameter of 85 μm or smaller is approximately ±2 mm for every image height in the main scanning direction. Similarly, the distance in the defocus direction on the surface to be scanned for achieving a spot diameter of 95 μm or smaller is approximately ±5 mm for every image height in the sub-scanning direction, and hence a sufficient depth of focus is obtained.

In addition, FIG. 15C is a graph of the curvature of the scanning line, i.e., a graph in which an arrival position of a principal ray in the sub-scanning direction on the surface to be scanned at each image height is plotted with the axial position set as zero. It is understood that the curvature of the scanning line (linearity of the scanning line) is corrected appropriately with a peak to peak (P-P) value being 15 μm or smaller.

In addition, in this embodiment, a sagittal line aspherical surface (Z4-th order) is also used so as to realize a system with little change in focus in the sub-scanning direction even if a location error of the incident optical system or the like occurs and causes a variation of the irradiation position.

Further, in this embodiment, the optical axis of the second imaging lens 26 is shifted upward to the positive side in the Z direction with respect to the normal A to the deflecting surface including the deflection reference point on the deflecting surface of the light beam entering the deflecting surface obliquely from the bottom (negative) direction in the sub-scanning section, and hence the curvature of the scanning line and the 45-degree astigmatism are corrected appropriately.

If the oblique incident direction in the sub-scanning section is the upward direction (positive), the optical axis of the second imaging lens 26 is shifted downward to the negative side in the Z direction with respect to the normal A to the deflecting surface including the deflection point on the deflecting surface of the light beam entering the deflecting surface obliquely from the bottom (positive) direction, and hence the curvature of the scanning line and the 45-degree astigmatism can be corrected appropriately.

In other words, if the oblique incident direction in the sub-scanning section is the upward direction (positive), the shift direction in the Z direction and the sagittal line tilt coefficient (Mi_1) of the second imaging lens 26 are to be reversed.

Third Embodiment

Figure 16:
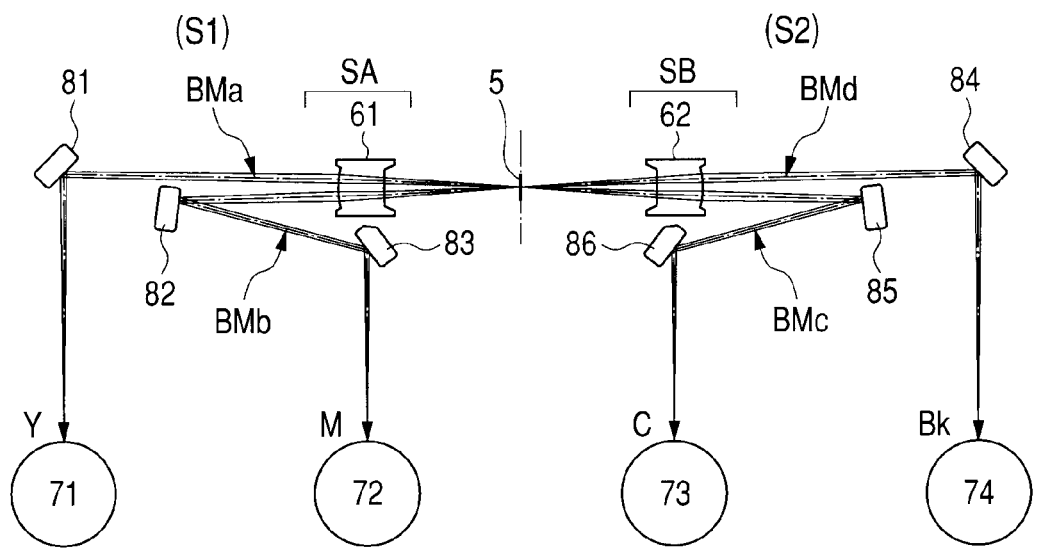
FIG. 16 is a sub-scanning sectional view of a main part of an optical scanning apparatus according to a third embodiment of the present invention.

FIG. 16 is a sub-scanning sectional view of a color image forming apparatus according to a third embodiment of the present invention. In FIG. 16, an element that is the same as the element illustrated in FIG. 1A is denoted by the same reference symbol.

This embodiment is different from the first embodiment described above in that the present invention is applied to a color image forming apparatus constituted by four image bearing members (photosensitive drums) 71 to 74 corresponding to Y (yellow), M (magenta), C (cyan), and Bk (black) colors, respectively. Other structure and optical action are the same as in the first embodiment, and hence a similar effect can be obtained.

In other words, two optical scanning apparatuses are used in this embodiment (but the deflecting unit 5 is shared). Further, two light beams are guided to enter the individual imaging optical systems SA and SB, and hence four light beams are guided to enter the common deflecting unit 5 at the same time. Then, the common deflecting unit deflects the four light beams, so as to scan the corresponding photosensitive drums 71 to 74 with light. As illustrated in FIG. 16, two optical scanning apparatuses S1 and S2 are disposed. The deflecting unit 5 is constituted by an MEMS (Micro Electro Mechanical System) having a substantially uniform angular velocity.

Reflection mirrors 81 to 86 respectively reflect the light beams deflected for scanning by the deflecting unit 5 to the corresponding photosensitive drum surfaces 71 to 74. The imaging optical system SA of the optical scanning apparatus S1 is constituted by a single imaging lens 61 having the fθ-characteristic formed by plastic molding. The imaging optical system SB of the optical scanning apparatus S2 is constituted by a single imaging lens 62 having the fθ-characteristic formed by plastic molding.

The imaging lenses 61 and 62 of this embodiment have the incident surface and the exit surface formed as the surface in which the tilt angle of the sagittal line changes similarly to the first embodiment described above.

The imaging optical system SA (SB) of the optical scanning apparatus S1 (S2) causes two deflected light beams BMa and BMb (BMc and BMd) deflected for scanning by the deflecting unit 5 to form images on the photosensitive drum surfaces 71 and 72 (73 and 74) as surfaces to be scanned.

In this case, four light beams BMa, BMb, BMc, and BMd deflected for scanning on the deflecting surface of the deflecting unit 5 are guided to the corresponding four photosensitive drum surfaces (of cyan, magenta, yellow, and black) 71, 72, 73, and 74, respectively, via the corresponding imaging optical systems SA and SB. Then, when the deflecting unit 5 is rotated (oscillated), the photosensitive drum surfaces 71, 72, 73, and 74 are scanned with light, respectively. Thus, the scanning line is formed on each of the four photosensitive drum surfaces for recording an image.

Respective color signals of red (R), green (G), and blue (B) are input from an external device (not shown) such as a personal computer to the color image forming apparatus. The color signals are converted into pieces of image data (dot data) of cyan (C), magenta (M), yellow (Y), and black (B) by a printer controller 53 in the color image forming apparatus. The respective pieces of image data are input to two optical scanning apparatuses. Then, light beams, which are modulated according to the respective pieces of image data, are emitted from the optical scanning apparatuses. The photosensitive surfaces of the photosensitive drums are scanned with the light beams in the main scanning direction. The external device may be, for example, a color image reading device provided with a CCD sensor.

In addition, the color image forming apparatus of this embodiment includes a transferring device (not shown) for transferring a toner image developed by a developing unit onto a transfer material, and a fixing device (not shown) for fixing the transferred toner image on the transfer material, which are necessary for an electrophotography process.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-290755, filed Nov. 13, 2008, which is hereby incorporated by reference herein in its entirety.

What is claimed is:

1. An optical scanning apparatus comprising:
   a light source unit;
   an incident optical system for guiding a light beam emitted from the light source unit to a deflecting unit; and
   an imaging optical system for causing the light beam deflected for scanning on a deflecting surface of the deflecting unit to form an image on a surface to be scanned, wherein:
   the light beam emitted from the light source unit enters the deflecting surface of the deflecting unit in an oblique manner with respect to a plane perpendicular to a rotational axis of the deflecting unit in a sub-scanning section;
   the imaging optical system consists of a single imaging optical element;
   each of an incident surface and an exit surface of the single imaging optical element is a surface in which a tilt angle of a sagittal line changes from on axis toward off axis in a sub-scanning direction, the tilt angle of the sagittal line indicating a gradient of a surface normal to the sagittal line on a meridian line with respect to a main scanning section;
   the incident surface and the exit surface of the single imaging optical element each have the same sign for a difference between an axial tilt angle of the sagittal line indicating a gradient of the surface normal to the sagittal line on the meridian line with respect to the main scanning section and an off-axial tilt angle of the sagittal line indicating a gradient of the surface normal to the sagittal line on the meridian line with respect to the main scanning section;
   if an incident direction of the light beam entering the deflecting surface of the deflecting unit in an oblique manner with respect to the plane perpendicular to the rotational axis of the deflecting unit in the sub-scanning section is negative, a value of the difference is negative;
   if the incident direction of the light beam entering the deflecting surface of the deflecting unit in the oblique manner with respect to the plane perpendicular to the rotational axis of the deflecting unit in the sub-scanning section is positive, the value of the difference is positive; and
   the incident surface and the exit surface of the single imaging optical element each have the same sign for a rate of change of the tilt angle of the sagittal line, which changes from on axis toward off axis in the sub-scanning direction.

2. An optical scanning apparatus according to claim 1, wherein:
   if the incident direction of the light beam entering the deflecting surface of the deflecting unit in the oblique manner with respect to the plane perpendicular to the rotational axis of the deflecting unit in the sub-scanning section is negative, the off-axial tilt angle of the sagittal line on the incident surface of the single imaging optical element decreases monotonously outside 50%-image height on the incident surface in the main scanning direction, and the off-axial tilt angle of the sagittal line on the exit surface of the single imaging optical element decreases monotonously outside the 50%-image height on the exit surface in the main scanning direction; and
   if the incident direction of the light beam entering the deflecting surface of the deflecting unit in the oblique manner with respect to the plane perpendicular to the rotational axis of the deflecting unit in the sub-scanning section is positive, the off-axial tilt angle of the sagittal line on the incident surface of the single imaging optical element increases monotonously outside the 50%-image height on the incident surface in the main scanning direction, and the off-axial tilt angle of the sagittal line on the exit surface of the single imaging optical element increases monotonously outside the 50%-image height on the exit surface in the main scanning direction.

3. An optical scanning apparatus according to claim 1, wherein:
   if the incident direction of the light beam entering the deflecting surface of the deflecting unit in the oblique manner with respect to the plane perpendicular to the rotational axis of the deflecting unit in the sub-scanning section is negative, the rate of change of the off-axial tilt angle of the sagittal line on the incident surface of the single imaging optical element decreases monotonously outside 50%-image height on the incident surface in the main scanning direction, and the rate of change of the off-axial tilt angle of the sagittal line on the exit surface of the single imaging optical element decreases monotonously outside the 50%-image height on the exit surface in the main scanning direction; and
   if the incident direction of the light beam entering the deflecting surface of the deflecting unit in the oblique manner with respect to the plane perpendicular to the rotational axis of the deflecting unit in the sub-scanning section is positive, the rate of change of the off-axial tilt angle of the sagittal line on the incident surface of the single imaging optical element increases monotonously outside the 50%-image height on the incident surface in the main scanning direction, and the rate of change of the off-axial tilt angle of the sagittal line on the exit surface of the single imaging optical element increases monotonously outside the 50%-image height on the exit surface in the main scanning direction.

4. An optical scanning apparatus according to claim 3, wherein the incident surface and the exit surface of the single imaging optical element each have an axial sagittal line sectional shape formed as a meniscus shape having a concave surface toward a side of the deflecting unit, and a curvature radius of the sagittal line of the incident surface and a curvature radius of the sagittal line of the exit surface of the single imaging optical element decrease from on axis toward off axis in the main scanning direction.

5. An optical scanning apparatus according to claim 1, wherein a curvature radius of the sagittal line of the incident surface and a curvature radius of the sagittal line of the exit surface of the single imaging optical element change from on axis toward off axis in the main scanning direction, and at least one of the incident surface and the exit surface of the single imaging optical element has the curvature radius of the sagittal line which reverses from on axis toward off axis in the main scanning direction.

6. An optical scanning apparatus according to claim 1, wherein the imaging optical element consists of a molded lens.

7. An image forming apparatus comprising the optical scanning apparatus according to claim 1, and a photosensitive member disposed at the surface to be scanned.

8. An image forming apparatus comprising the optical scanning apparatus according to claim 1, and a printer controller for converting code data supplied from an external device into an image signal and for inputting the image signal to the optical scanning apparatus.

9. An optical scanning apparatus comprising:
a light source unit,
an incident optical system for guiding a light beam emitted from the light source unit to a deflecting unit; and
an imaging optical system for focusing the light beam deflected for scanning on a deflecting surface of the deflecting unit on a surface to be scanned,
wherein:
the light beam emitted from the light source unit enters the deflecting surface of the deflecting unit in an oblique manner with respect to a plane perpendicular to a rotational axis of the deflecting unit in a sub-scanning section;
each of an incident surface and an exit surface of the same imaging lens constituting the imaging optical system is a surface in which a tilt angle of a sagittal line changes from on axis toward off axis, the tilt angle of the sagittal line indicating a gradient of a surface normal to the sagittal line on a meridian line with respect to a main scanning section; and
the incident surface and the exit surface of the same imaging lens each have the same sign for a difference between a rate of change of an on-axis tilt angle of the sagittal line and a rate of change of an off-axial tilt angle of the sagittal line.

10. An optical scanning apparatus according to claim 9, wherein the imaging optical system comprises a single imaging lens.

11. An optical scanning apparatus according to claim 9, wherein the imaging optical system comprises two imaging lenses, and the incident surface and the exit surface of the same imaging lens on a side of the surface to be scanned are each formed as the surface in which the tilt angle of the sagittal line changes.

12. An optical scanning apparatus according to claim 11, wherein in each of the incident surface and the exit surface of the same imaging lens on the side of the surface to be scanned, a sign for a first difference between the rate of change of the tilt angle of the sagittal line on axis and a rate of change of the tilt angle in one of two off-axial sides of the sagittal line and a sign for a second difference between the rate of change of the tilt angle of the sagittal line on axis and a rate of change of the tilt angle in the other of the two off-axial sides of the sagittal line.

13. An optical scanning apparatus according to claim 9, wherein the same imaging lens consists of a molded lens.

14. An image forming apparatus comprising the optical scanning apparatus according to claim 9, and a photosensitive member disposed at the surface to be scanned.

15. An image forming apparatus comprising the optical scanning apparatus according to claim 9, and a printer controller for converting code data supplied from an external device into an image signal and for inputting the image signal to the optical scanning apparatus.

16. An optical scanning apparatus comprising:
a light source unit;
an incident optical system for guiding a light beam emitted from the light source unit to a deflecting unit; and
an imaging optical system for causing the light beam deflected for scanning on a deflecting surface of the deflecting unit to form an image on a surface to be scanned, wherein:
the light beam emitted from the light source unit enters the deflecting surface of the deflecting unit in an oblique manner with respect to a plane perpendicular to a rotational axis of the deflecting unit in a sub-scanning section;
each of an incident surface and an exit surface of an imaging optical element constituting the imaging optical system is a surface in which a tilt angle of a sagittal line changes from on axis toward off axis in a sub-scanning direction, the tilt angle of the sagittal line indicating a gradient of a surface normal to the sagittal line on a meridian line with respect to a main scanning section; and
an absolute value of a difference of a rate of change of the tilt angle of the sagittal line at the same image height between the incident surface of the imaging optical element and the exit surface of the imaging optical element is ⅕ or smaller of an absolute value of a rate of change of the tilt angle of the sagittal line at a most off-axial image height on the respective incident surface and the exit surface of the imaging optical element.

17. An optical scanning apparatus according to claim 16, wherein the imaging optical system comprises a single imaging optical element.

18. An optical scanning apparatus according to claim 16, wherein the imaging optical system comprises two imaging optical elements, and the incident surface and the exit surface of an imaging optical element on a side of the surface to be scanned are each formed as the surface in which the tilt angle of the sagittal line changes.

19. An optical scanning apparatus according to claim 16, wherein the imaging optical element consists of a molded lens.

20. An image forming apparatus comprising the optical scanning apparatus according to claim 16, and a photosensitive member disposed at the surface to be scanned.

21. An image forming apparatus comprising the optical scanning apparatus according to claim 16, and a printer controller for converting code data supplied from an external device into an image signal so that the image signal is received by the optical scanning apparatus.

* * * * *